United States Patent
Monteuuis et al.

(10) Patent No.: US 12,245,038 B2
(45) Date of Patent: Mar. 4, 2025

(54) SENSOR MISBEHAVIOR DETECTION SYSTEM UTILIZING COMMUNICATIONS

(71) Applicant: QUALCOMM Incorporated, San Diego, CA (US)

(72) Inventors: Jean-Philippe Monteuuis, Northborough, MA (US); Jonathan Petit, Wenham, MA (US); Soumya Das, San Diego, CA (US); Mohammad Nekoui, San Diego, CA (US); Cong Chen, San Diego, CA (US); Mohammad Raashid Ansari, Lowell, MA (US)

(73) Assignee: QUALCOMM INCORPORATED, San Diego, CA (US)

( * ) Notice: Subject to any disclaimer, the term of this patent is extended or adjusted under 35 U.S.C. 154(b) by 218 days.

(21) Appl. No.: 17/931,050

(22) Filed: Sep. 9, 2022

(65) Prior Publication Data
US 2024/0089736 A1    Mar. 14, 2024

(51) Int. Cl.
*H04W 12/121* (2021.01)
*H04W 4/40* (2018.01)

(52) U.S. Cl.
CPC .......... *H04W 12/121* (2021.01); *H04W 4/40* (2018.02)

(58) Field of Classification Search
CPC ... H04W 12/121; H04W 4/40; H04W 12/122; H04L 63/1416
See application file for complete search history.

(56) References Cited

U.S. PATENT DOCUMENTS

| 10,694,262 | B1 * | 6/2020 | Hedman | H04N 21/44008 |
| 2018/0004210 | A1 * | 1/2018 | Iagnemma | H04L 67/52 |
| 2018/0031384 | A1 * | 2/2018 | Lee | G06V 20/58 |
| 2019/0132709 | A1 * | 5/2019 | Graefe | G08G 1/0133 |
| 2019/0297499 | A1 * | 9/2019 | Hawkes | H04W 12/40 |
| 2020/0089969 | A1 * | 3/2020 | Lakshmi Narayanan | G06V 20/49 |
| 2020/0158864 | A1 * | 5/2020 | Achour | H04W 4/40 |
| 2020/0342760 | A1 * | 10/2020 | Vassilovski | G08G 1/161 |
| 2021/0281986 | A1 * | 9/2021 | Zhu | H04L 63/1425 |
| 2022/0095115 | A1 * | 3/2022 | Shimizu | H04W 12/104 |
| 2022/0230537 | A1 | 7/2022 | Whyte et al. | |

(Continued)

FOREIGN PATENT DOCUMENTS

CN        107957583 A    4/2018

OTHER PUBLICATIONS

Mousavinejad et al., "Distributed Cyber Attacks Detection and Recovery Mechanism for Vehicle Platooning", Sep. 2020, IEEE Transactions on Intelligent Transportation Systems, vol. 21, No. 9, pp. 3821-3834 (Year: 2020).*

(Continued)

*Primary Examiner* — Kenneth W Chang
(74) *Attorney, Agent, or Firm* — Polsinelli LLP

(57) ABSTRACT

Disclosed are systems, apparatuses, processes, and computer-readable media for wireless communications. For example, an example of a process includes detecting an object based on sensor data from at least one sensor of the network device. The process further includes receiving, by the network device, a vehicle-based message comprising message data related to the object. The process further includes comparing, by the network device, the sensor data and the message data and detecting, by the network device, malicious behavior based on the comparing.

37 Claims, 29 Drawing Sheets

(56) References Cited

U.S. PATENT DOCUMENTS

2022/0256333 A1     8/2022  Whyte et al.
2022/0276375 A1*    9/2022  Armstrong-Crews ..................... G01S 13/42

OTHER PUBLICATIONS

International Search Report and Written Opinion—PCT/US2023/069516—ISA/EPO—Sep. 26, 2023.

* cited by examiner

PROBABILITY OF LOS AND NLOSv STATES

| | Highway 1410 |
|---|---|
| LOS | If $d \leq 475m$, $P(LOS) = \min\{1, ad^2 + bd + c\}$ where $a=2.1013*10^{-6}$, $b=-0.002$ and $c=1.01093$ If $d > 475m$, $P(LOS) = \max\{0, 0.54-0.001(d-475)\}$ |
| NLOSv | $P(NLOSs) = 1 - P(LOS)$ |
| | Urban 1420 |
| LOS | $P(LOS) = \min\{1, 1.05*\exp(-0.0114d)\}$ |
| NLOSv | $P(NLOSs) = 1 - P(LOS)$ |

SENSOR MISBEHAVIOR DETECTION SYSTEM UTILIZING COMMUNICATIONS

FIELD

The present disclosure generally relates to vehicle communications. For example, aspects of the present disclosure relate to a sensor misbehavior detection system utilizing communications, such as vehicle-to-everything (V2X) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, vehicle-to-vehicle (V2V), and/or device-to-device (D2D) communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for a V2X-sensor misbehavior detection system. According to at least one example, a method is provided for wireless communications at a network device. The method includes: detecting an object based on sensor data from at least one sensor of the network device; receiving, by the network device, a vehicle-based message comprising message data related to the object; comparing, by the network device, the sensor data and the message data; and detecting, by the network device, malicious behavior based on the comparing.

In another example, an apparatus for wireless communications is provided that includes at least one memory and at least one processor coupled to the at least one memory. The at least one processor is configured to: detect an object based on sensor data from at least one sensor of a network device; receive a vehicle-based message comprising message data related to the object; compare the sensor data and the message data; and detect malicious behavior based on the comparing.

In another example, a non-transitory computer-readable medium is provided that has stored thereon instructions that, when executed by one or more processors, cause the one or more processors to: detect an object based on sensor data from at least one sensor of a network device; receive a vehicle-based message comprising message data related to the object; compare the sensor data and the message data; and detect malicious behavior based on the comparing.

In another example, an apparatus for wireless communications is provided. The apparatus includes: means for detecting an object based on sensor data from at least one sensor of the network device; means for receiving a vehicle-based message comprising message data related to the object; means for comparing the sensor data and the message data; and means for detecting malicious behavior based on the comparing.

In some aspects, the apparatus is, includes, or is part of, a vehicle (e.g., an automobile, truck, etc., or a component or system of an automobile, truck, etc.), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures:

FIG. 14 is a table that may be used for estimating probabilities for line of sight (LoS) and non-line of sight (NLoS) objects, in accordance with some aspects of the present disclosure.

DETAILED DESCRIPTION

Figure 1:
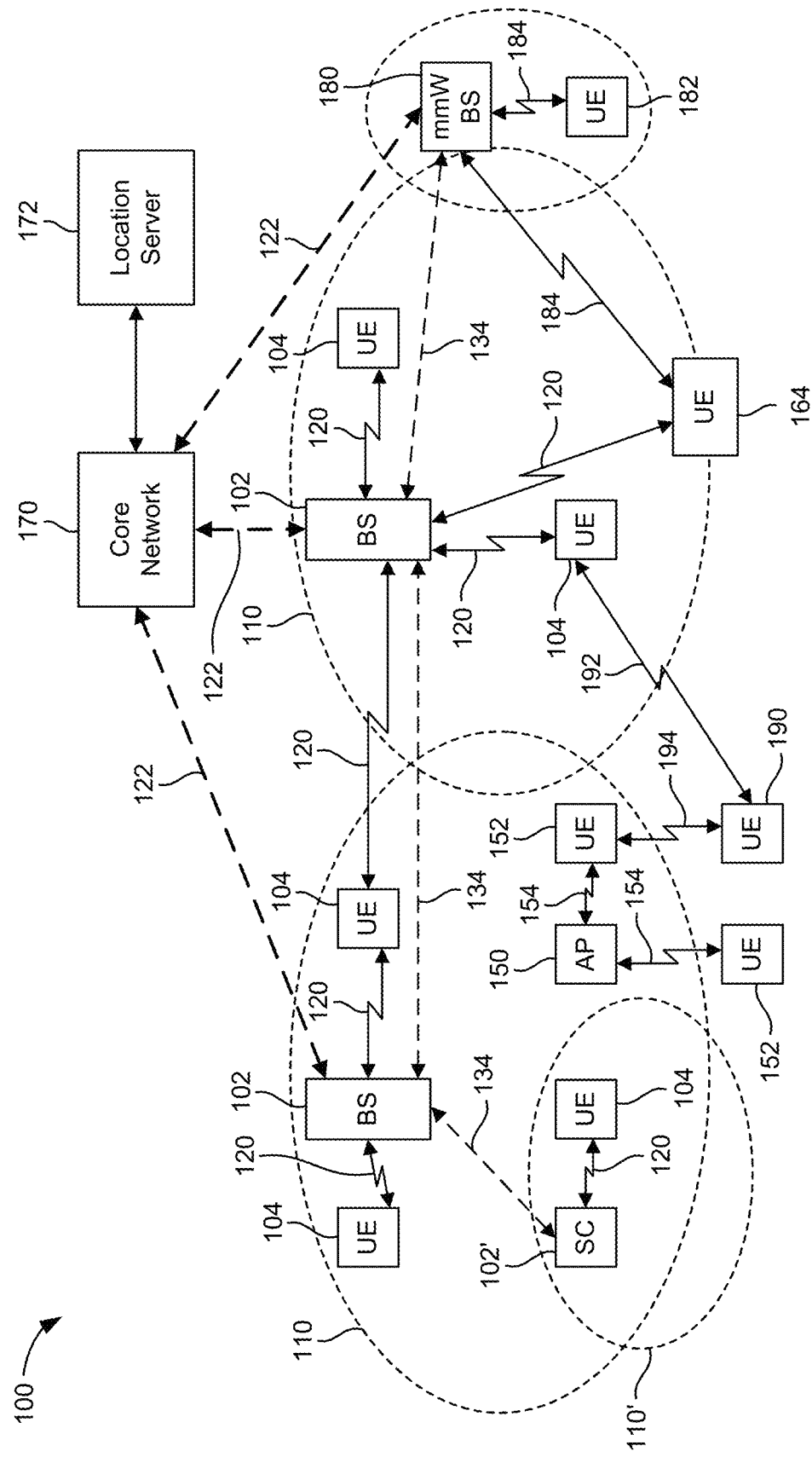
FIG. 1 is a diagram illustrating an example wireless communications system, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Vehicles are an example of systems that can include wireless communications capabilities. For example, vehicles (e.g., automotive vehicles, autonomous vehicles, aircraft, maritime vessels, among others) can communicate with other vehicles and/or with other devices that have wireless communications capabilities. Wireless vehicle communication systems encompass vehicle-to-vehicle (V2V), vehicle-to-infrastructure (V2I), vehicle-to-network (V2N), and vehicle-to-pedestrian (V2P) communications, which are all collectively referred to as vehicle-to-everything (V2X) communications. V2X communications is a vehicular communication system that supports the wireless transfer of information from a vehicle to other entities (e.g., other vehicles, pedestrians with smart phones, equipped vulnerable road users (VRUs), such as bicyclists, and/or other traffic infrastructure) located within the traffic system that may affect the vehicle. The main purpose of the V2X technology is to improve road safety, fuel savings, and traffic efficiency.

In a V2X communication system, information is transmitted from vehicle sensors (and other sources) through wireless links to allow the information to be communicated to other vehicles, pedestrians, VRUs, and/or traffic infrastructure. The information may be transmitted using one or more vehicle-based messages, such as cellular-vehicle-to-everything (C-V2X) messages, which can include Sensor Data Sharing Messages (SDSMs), Basic Safety Messages (BSMs), Cooperative Awareness Messages (CAMs), Collective Perception Messages (CPMs), Decentralized Environmental Messages (DENMs), and/or other types of vehicle-based messages. By sharing this information with other vehicles, the V2X technology improves vehicle (and driver) awareness of potential dangers to help reduce collisions with other vehicles and entities. In addition, the V2X technology enhances traffic efficiency by providing traffic warnings to vehicles of potential upcoming road dangers and obstacles such that vehicles may choose alternative traffic routes.

As previously mentioned, the V2X technology includes V2V communications, which can also be referred to as peer-to-peer communications. V2V communications allows for vehicles to directly wireless communicate with each other while on the road. With V2V communications, vehicles can gain situational awareness by receiving information regarding upcoming road dangers (e.g., unforeseen oncoming vehicles, accidents, and road conditions) from the other vehicles.

The IEEE 802.11p Standard supports (uses) a dedicated short-range communications (DSRC) interface for V2X wireless communications. Characteristics of the IEEE 802.11p based DSRC interface include low latency and the use of the unlicensed 5.9 Gigahertz (GHz) frequency band. C-V2X was adopted as an alternative to using the IEEE 802.11p based DSRC interface for the wireless communications. The 5G Automotive Association (5GAA) supports the use of C-V2X technology. In some cases, the C-V2X technology uses Long-Term Evolution (LTE) as the underlying technology, and the C-V2X functionalities are based on the LTE technology. C-V2X includes a plurality of operational modes. One of the operational modes allows for direct wireless communication between vehicles over the LTE sidelink PC5 interface. Similar to the IEEE 802.11p based DSRC interface, the LTE C-V2X sidelink PC5 interface operates over the 5.9 GHz frequency band. Vehicle-based messages, such as BSMs and CAMs, which are application layer messages, are designed to be wirelessly broadcasted over the 802.11p based DSRC interface and the LTE C-V2X sidelink PC5 interface.

In one or more cases, a transmitting network device (e.g., a V2X-capable vehicle that generates and sends vehicle-based messages) may be misbehaving (e.g., operating as a misbehaving vehicle) by sending (e.g., either purposely or not purposely) vehicle-based messages containing incorrect information. For example, a transmitting network device may be operating as a misbehaving vehicle if the information contained within its vehicle-based messages identifies an incorrect position (location) for the transmitting network device.

In some cases, a transmitting network device (e.g., a V2X-capable vehicle that generates and sends vehicle-based messages) may be operating as a misbehaving vehicle or an attacker and misbehaving, such as by including false information in a V2X message or creating a non-visible, V2X ghost object to disturb traffic on the road. A ghost V2X object is a V2X object (e.g., an object perceived by V2X sensors) that is not located at the location indicated by the transmitting network device. Ghost V2X objects are objects with no physical existence, such as a simulated vulnerable road user (VRU) or a simulated vehicle. A non-visible object is an object that is out of a sensor field-of-view (FoV) or not in the line-of-sight (LoS) (e.g., a non-line of sight scenario) of a receiving network device (e.g., a V2X-capable vehicle that receives vehicle-based messages).

In some cases, an attacker can use V2X attacks that may only be detectable by sensors. For example, an attacker can create ghost vehicles that mimic real vehicles. In another example, an attacker may include false information (e.g., false traffic light information, such as information indicating that, at certain time, a traffic light is illuminated red, when the traffic light is actually illuminated green) in a vehicle-based message. The goal of an attacker can be to cause the driver to perform unnecessary maneuvers (e.g., decelerating), which can result in frustration to the driver and/or cause a disruption to traffic, which can result in a traffic jam and/or a vehicle collision. Attacks that mimic the mobility of vehicles can be very difficult to detect without the use of sensors (e.g., cameras, radar sensors, LIDAR sensors, and/or other sensors).

Currently, V2X-sensor solutions are insufficient to detect such attacks. For example, current solutions may only scan for a single type of message (e.g., a CAM or a BSM), while an attacker may target multiple message types. For another example, current solutions may only rely on a single detector (e.g., a ghost-V2X detector) and, as such, these current solutions can only detect a single V2X attack.

Systems, apparatuses, apparatuses (e.g., network devices), methods (also referred to as processes), and computer-readable media (collectively referred to herein as "systems and techniques") are provided for optimizing situational awareness of vehicle misbehavior, which can lead to a disruption in traffic. The systems and techniques can provide a V2X-sensor misbehavior detection system that utilizes information from sensors (e.g., cameras, radar, and LIDAR) to verify (or confirm) information (e.g., vehicle and/or traffic infrastructure information) contained within vehicle-based messages. In one or more aspects, the systems and techniques may include a plurality of processes, which may include, but are not limited to, data alignment, data association, misbehavior reporting, objection detection (e.g., via sensors), spatial and temporal alignment, and estimation probabilities for line of sight (LoS) and non-line of sight (NLoS) objects.

In one or more aspects, data alignment may be related to time. For example, sensor data and CPM data may not be generated at the same time (e.g., the data, such as for a vehicle location, may be generated with a 10 second time difference, such that the sensor data is generated 10 seconds after the CPM data is generated). Without the use of time alignment (e.g., the sensor data and the CPM data are aligned at the same time), consistency between the sensor data and the CPM data cannot be verified (or confirmed). Sensor data and CPM data can be aligned in time by utilizing a mobility estimation algorithm, such using as a least square time mean (LSTM) algorithm or a Kalman Filter.

Additionally or alternatively, in some aspects, data alignment may be related to space. For instance, sensor data and CPM data may not have the same referential frame. In one example, the sensor data may rely on polar coordinates or a relative positioning format (e.g., where the sensor data position is an offset of the sensor position). In another example, a message format (e.g., a CPM format) may use Cartesian coordinates (e.g., based on global maps) or a relative positioning format (e.g., where the sensor of the transmitting device sending the message is located at an origin). The sensor and message (e.g., CPM) positioning data may have the same referential frame (e.g., the CPM receiver can be located at the origin and Cartesian coordinates) in order to be able to verify (or confirm) a consistency between the sensor data and the message data (e.g., CPM data).

In some cases, distance information (e.g., for 5G NR V2X, in 3GPP Release 16) may be calculated using a distance-based feedback transmission. For example, a sender (transmitter) may include in signaling information (e.g., Sidelink Control Information (SCI) part 2) the location of the sender (e.g., it may not be an exact location, but rather a coarse location in a grid) and a Minimum Communication Range (MCR). This location and range information related to the sender may not be part of any application layer message (e.g., a BSM or SDSM), but rather may be part of a control message, which may accompany any application layer message. A receiver (e.g., which is located is inside of the MCR and is able to decode this control information, but is unable to decode the corresponding data) can send (transmit) a non-acknowledgement message (NACK) to the originator (e.g., sender). After receiving the NACK, the originator (e.g., sender) can then retransmit the information.

In one or more aspects, estimation probabilities for LoS and NLoS objects (e.g., for 5G NR V2X, in 3GPP Release 16) can estimate whether a LoS path is blocked by another vehicle by using, for example, a local dynamic map and a calculation of a three-dimensional LoS. For estimating whether a LoS path is blocked by another vehicle, computation formulas (e.g., formulas for highway 1410 and urban 1420 driving scenarios in table 1400 of FIG. 14) for the probability of LoS (e.g., P(LoS)) may be utilized, where a distance (d) is between a host vehicle (HV) and a remote vehicle (RV), and the HV and RV should be located on the same road. The highway and urban driving scenarios can be determined based on the type of road (e.g., which may be determined by using an embedded map), a perceived speed limit for the road, and an average self-speed for driving within a certain time period.

In the current European Telecommunications Standards Institute (ETSI) Technical Specification (TS) 103 759, the first version (V1) includes detectors that do not rely on senor information. However, the second version (V2) plans to specify new categories of detectors that can use sensor information. The standards should define V2X-sensor detectors, which are able to use sensor information to verify (confirm) information (e.g., location information) contained within vehicle-based messages. For example, these V2X-sensor detectors may be able to verify (confirm) if a color (e.g., red) of a traffic light contained within a Signal, Phase, and Time (SPaT) message is consistent with a color (e.g., red) of that traffic light perceived by a camera (sensor).

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (MC), or a Non-Real Time (Non-RT) MC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (MC), or a Non-Real Time (Non-RT) MC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
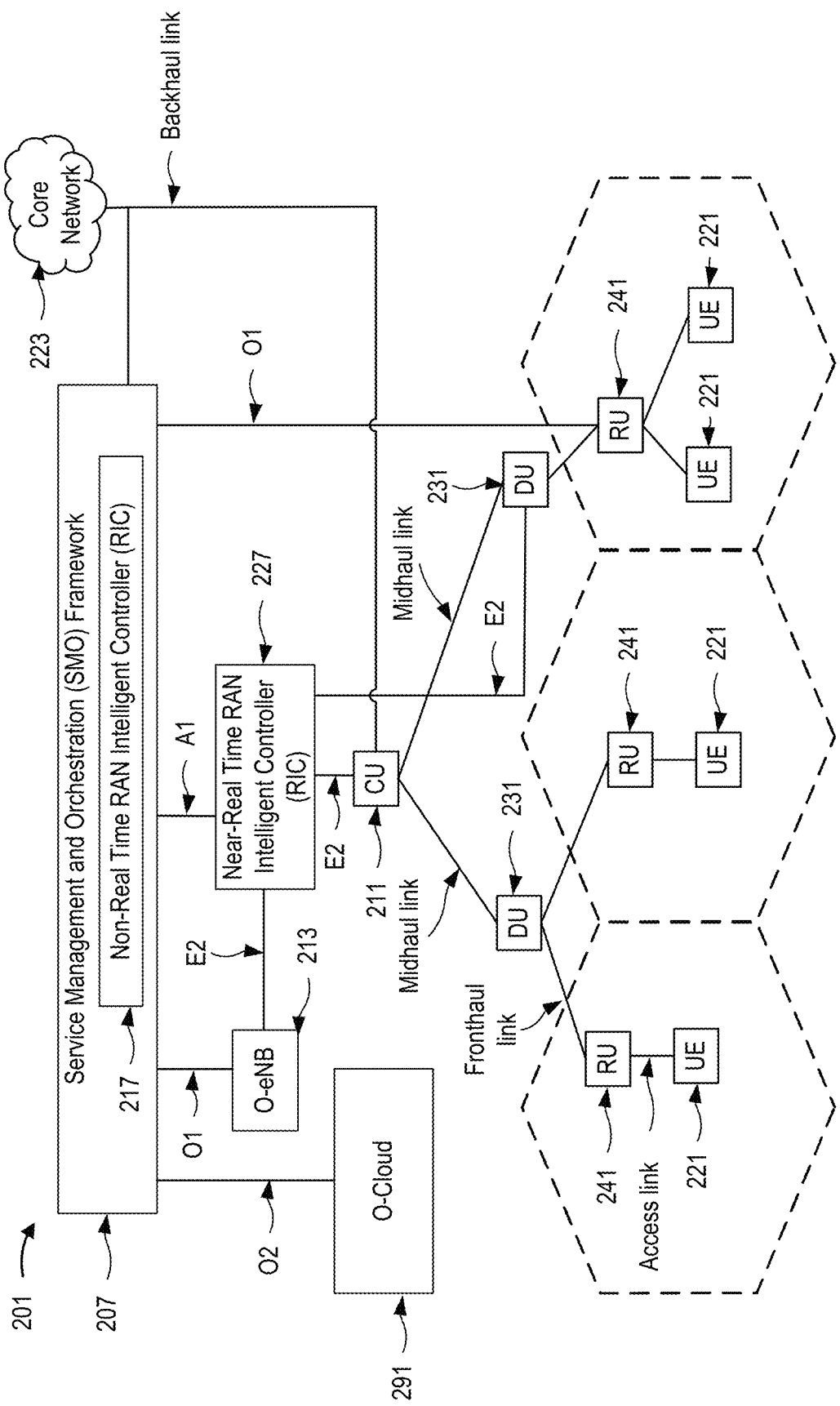
FIG. 2 is a diagram illustrating an example of a disaggregated base station architecture, which may be employed by the disclosed V2X-sensor misbehavior detection system, in accordance with some aspects of the present disclosure.

FIG. 2 is a diagram illustrating an example of a disaggregated base station architecture, which may be employed by the disclosed V2X-sensor misbehavior detection system, in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 2 shows a diagram illustrating an example disaggregated base station 201 architecture. The disaggregated base station 201 architecture may include one or more central units (CUs) 211 that can communicate directly with a core network 223 via a backhaul link, or indirectly with the core network 223 through one or more disaggregated base station units (such as a Near-Real Time (Near-RT) RAN Intelligent Controller (RIC) 227 via an E2 link, or a Non-Real Time (Non-RT) RIC 217 associated with a Service Management and Orchestration (SMO) Framework 207, or both). A CU 211 may communicate with one or more distributed units (DUs) 231 via respective midhaul links, such as an F1 interface. The DUs 231 may communicate with one or more radio units (RUs) 241 via respective fronthaul links. The RUs 241 may communicate with respective UEs 221 via one or more RF access links. In some implementations, the UE 221 may be simultaneously served by multiple RUs 241.

Each of the units, i.e., the CUs 211, the DUs 231, the RUs 241, as well as the Near-RT RICs 227, the Non-RT RICs 217 and the SMO Framework 207, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 211 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211. The CU 211 may be configured to handle user plane functionality (i.e., Central Unit—User Plane (CU-UP)), control plane functionality (i.e., Central Unit—Control Plane (CU-CP)), or a combination thereof. In some implementations, the CU 211 can be logically split into one or more CU-UP units and one or more CU-CP units. The CU-UP unit can communicate bidirectionally with the CU-CP unit via an interface, such as the E1 interface when implemented in an O-RAN configuration. The CU 211 can be implemented to communicate with the DU 131, as necessary, for network control and signaling.

The DU 231 may correspond to a logical unit that includes one or more base station functions to control the operation of one or more RUs 241. In some aspects, the DU 231 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 231 may further host one or more low PHY layers. Each layer (or module) can be implemented with an interface configured to communicate signals with other layers (and modules) hosted by the DU 231, or with the control functions hosted by the CU 211.

Lower-layer functionality can be implemented by one or more RUs 241. In some deployments, an RU 241, controlled by a DU 231, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241 can be implemented to handle over the air (OTA) communication with one or more UEs 221. In some implementations, real-time and non-real-time aspects of control and user plane communication with the RU(s) 241 can be controlled by the corresponding DU 231. In some scenarios, this configuration can enable the DU(s) 231 and the CU 211 to be implemented in a cloud-based RAN architecture, such as a vRAN architecture.

The SMO Framework 207 may be configured to support RAN deployment and provisioning of non-virtualized and virtualized network elements. For non-virtualized network elements, the SMO Framework 207 may be configured to support the deployment of dedicated physical resources for RAN coverage requirements which may be managed via an operations and maintenance interface (such as an O1 interface). For virtualized network elements, the SMO Framework 207 may be configured to interact with a cloud computing platform (such as an open cloud (O-Cloud) 291) to perform network element life cycle management (such as to instantiate virtualized network elements) via a cloud computing platform interface (such as an O2 interface). Such virtualized network elements can include, but are not limited to, CUs 211, DUs 231, RUs 241 and Near-RT RICs 227. In some implementations, the SMO Framework 207 can communicate with a hardware aspect of a 4G RAN, such as an open eNB (O-eNB) 213, via an O1 interface. Additionally, in some implementations, the SMO Framework 207 can communicate directly with one or more RUs 241 via an O1 interface. The SMO Framework 207 also may include a Non-RT RIC 217 configured to support functionality of the SMO Framework 207.

The Non-RT RIC 217 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 227. The Non-RT RIC 217 may be coupled to or communicate with (such as via an A1 interface) the Near-RT RIC 227. The Near-RT RIC 227 may be configured to include a logical function that enables near-real-time control and optimization of RAN elements and resources via data collection and actions over an interface (such as via an E2 interface) connecting one or more CUs 211, one or more DUs 231, or both, as well as an O-eNB 213, with the Near-RT RIC 227.

In some implementations, to generate AI/ML models to be deployed in the Near-RT MC 227, the Non-RT RIC 217 may receive parameters or external enrichment information from external servers. Such information may be utilized by the Near-RT MC 227 and may be received at the SMO Framework 207 or the Non-RT RIC 217 from non-network data sources or from network functions. In some examples, the Non-RT MC 217 or the Near-RT MC 227 may be configured to tune RAN behavior or performance. For example, the Non-RT MC 217 may monitor long-term trends and patterns for performance and employ AI/ML models to perform corrective actions through the SMO Framework 207 (such as reconfiguration via 01) or via creation of RAN management policies (such as A1 policies).

Figure 3:
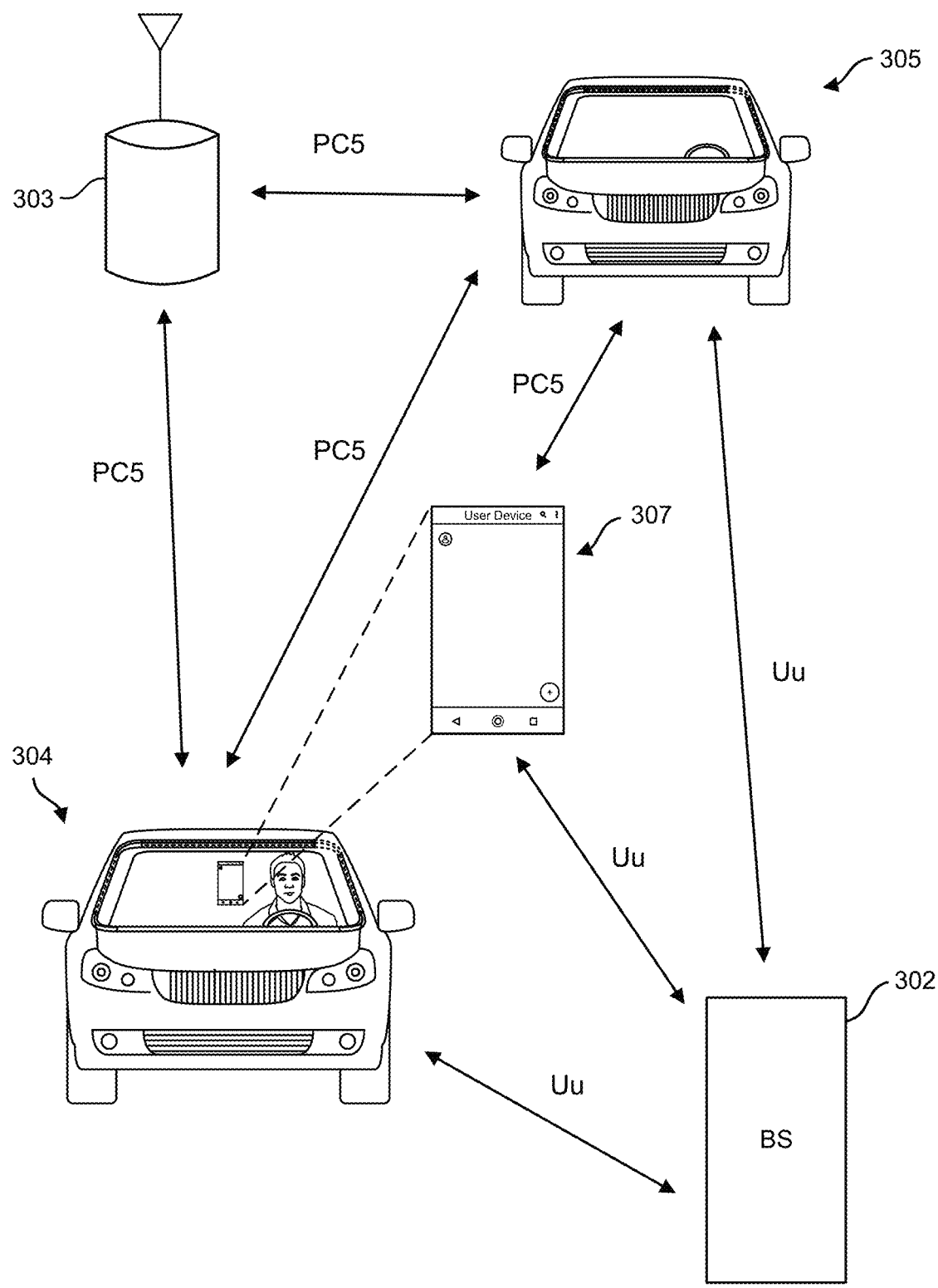
FIG. 3 is a diagram illustrating an example of various user equipment (UEs) communicating over direct communication interfaces (e.g., a cellular based PC5 sidelink interface, 802.11p defined DSRC interface, or other direct interface) and wide area network (Uu) interfaces, in accordance with some aspects of the present disclosure.

FIG. 3 illustrates examples of different communication mechanisms used by various UEs. In one example of sidelink communications, FIG. 3 illustrates a vehicle 304, a vehicle 305, and an RSU 303 communicating with each other using PC5, DSRC, or other device to device direct signaling interfaces. In addition, the vehicle 304 and the vehicle 305 may communicate with a base station 302 (shown as BS 302) using a network (Uu) interface. The base station 302 can include a gNB in some examples. FIG. 3 also illustrates a user device 307 communicating with the base station 302 using a network (Uu) interface. As described below, functionalities can be transferred from a vehicle (e.g., vehicle 304) to a user device (e.g., user device 307) based on one or more characteristics or factors (e.g., temperature, humidity, etc.). In one illustrative example, V2X functionality can be transitioned from the vehicle 304 to the user device 307, after which the user device 307 can communicate with other vehicles (e.g., vehicle 305) over a PC5 interface (or other device to device direct interface, such as a DSRC interface), as shown in FIG. 3.

While FIG. 3 illustrates a particular number of vehicles (e.g., two vehicles 304 and 305) communicating with each other and/or with RSU 303, BS 302, and/or user device 307, the present disclosure is not limited thereto. For instance, tens or hundreds of such vehicles may be communicating with one another and/or with RSU 303, BS 302, and/or user device 307. At any given point in time, each such vehicle, RSU 303, BS 302, and/or user device 307 may transmit various types of information as messages to other nearby vehicles resulting in each vehicle (e.g., vehicles 304 and/or 305), RSU 303, BS 302, and/or user device 307 receiving hundreds or thousands of messages from other nearby vehicles, RSUs, base stations, and/or other UEs per second.

While PC5 interfaces are shown in FIG. 3, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 4:
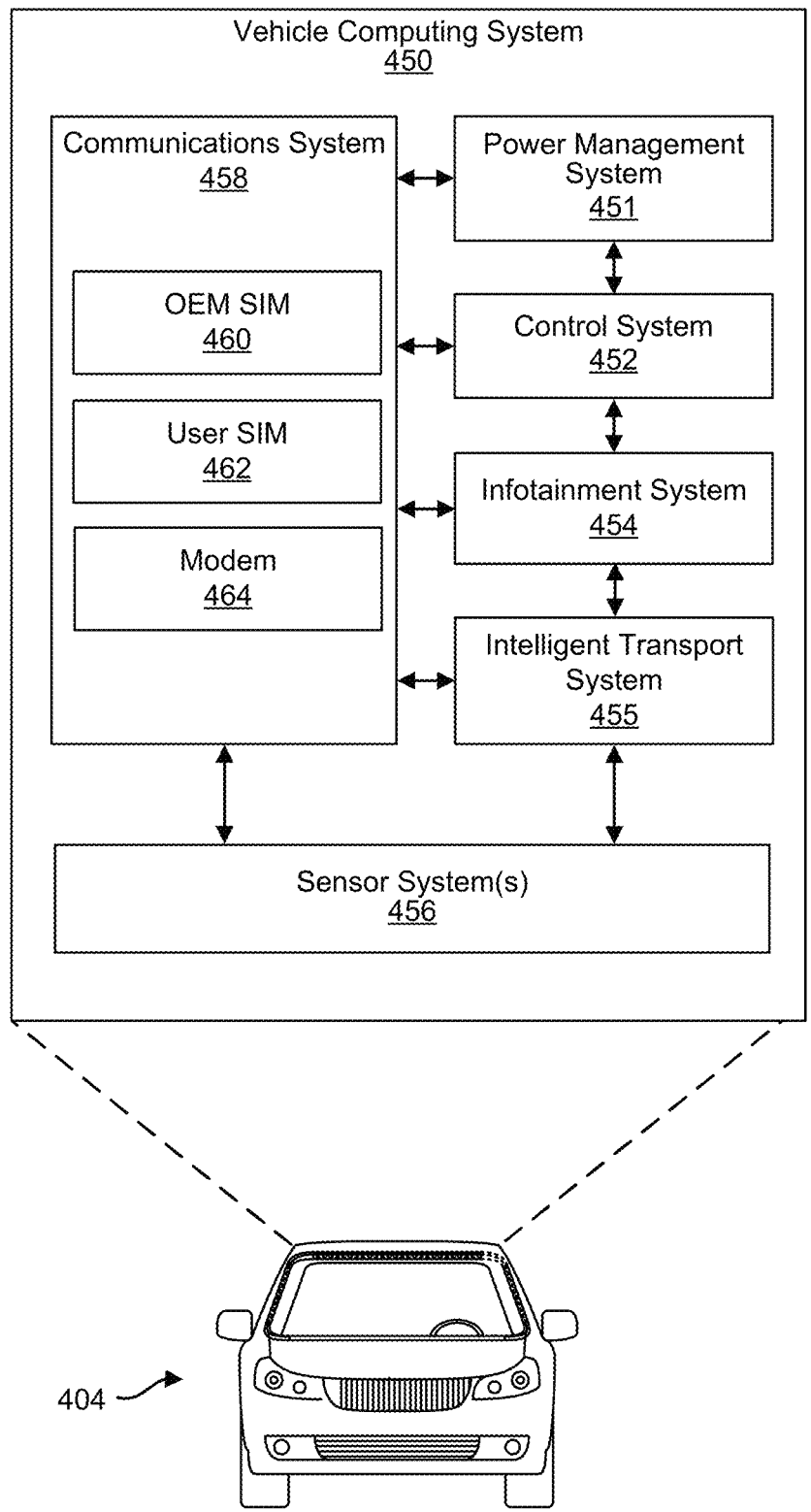
FIG. 4 is a block diagram illustrating an example of a computing system of a vehicle, in accordance with some aspects of the present disclosure.

FIG. 4 is a block diagram illustrating an example a vehicle computing system 450 of a vehicle 404. The vehicle 404 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 450 can include at least a power management system 451, a control system 452, an infotainment system 454, an intelligent transport system (ITS) 455, one or more sensor systems 456, and a communications system 458. In some cases, the vehicle computing system 450 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 can be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 can include one or more electronic control units (ECUs). An ECU can control one or more of the electrical systems or subsystems in a vehicle. Examples of specific ECUs that can be included as part of the control system 452 include an engine control module (ECM), a powertrain control module (PCM), a transmission control module (TCM), a brake control module (BCM), a central control module (CCM), a central timing module (CTM), among others. In some cases, the control system 452 can receive sensor signals from the one or more sensor systems 456 and can communicate with other systems of the vehicle computing system 450 to operate the vehicle 404.

The vehicle computing system 450 also includes a power management system 451. In some implementations, the power management system 451 can include a power management integrated circuit (PMIC), a standby battery, and/or other components. In some cases, other systems of the vehicle computing system 450 can include one or more PMICs, batteries, and/or other components. The power management system 451 can perform power management functions for the vehicle 404, such as managing a power supply for the computing system 450 and/or other parts of the vehicle. For example, the power management system 451 can provide a stable power supply in view of power fluctuations, such as based on starting an engine of the vehicle. In another example, the power management system 451 can perform thermal monitoring operations, such as by checking ambient and/or transistor junction temperatures. In another example, the power management system 451 can perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 can have any number of SIMs (e.g., one SIM or more than two SIMS) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 460 can be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 462 can be used by the communications system 458 for performing wireless network access functions in order to support a user data connection (e.g., for conducting phone calls, messaging, Infotainment related services, among others). In some cases, a user device of a user can connect with the vehicle computing system 450 over an interface (e.g., over PC5, Bluetooth™, WiFI™ (e.g., DSRC), a universal serial bus (USB) port, and/or other wireless or wired interface). Once connected, the user device can transfer wireless network access functionality from the user device to communications system 458 the vehicle, in which case the user device can cease performance of the wireless network access functionality (e.g., during the period in which the communications system 458 is performing the wireless access functionality). The communications system 458 can begin interacting with a base station to perform one or more wireless communication operations, such as facilitating a phone call, transmitting and/or receiving data (e.g., messaging, video, audio, etc.), among other operations. In such cases, other components of the vehicle computing system 450 can be used to output data received by the communications system 458. For example, the infotainment system 454 (described below) can display video received by the communications system 458 on one or more displays and/or can output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) can be used for communication of data for the OEM SIM 460 and/or the user SIM 462. In some examples, the modem 464 can include a 4G (or LTE) modem and another modem (not shown) of the communications system 458 can include a 5G (or NR) modem. In some examples, the communications system 458 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) can be used for performing V2X communications (e.g., with other vehicles for V2V communications, with other devices for D2D communications, with infrastructure systems for V2I communications, with pedestrian UEs for V2P communications, etc.). In some examples, the communications system 458 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 458 can be or can include a telematics control unit (TCU). In some implementations, the TCU can include a network access device (NAD) (also referred to in some cases as a network control unit or NCU). The NAD can include the modem 464, any other modem not shown in FIG. 4, the OEM SIM 460, the user SIM 462, and/or other components used for wireless communications. In some examples, the communications system 458 can include a Global Navigation Satellite System (GNSS). In some cases, the GNSS can be part of the one or more sensor systems 456, as described below. The GNSS can provide the ability for the vehicle computing system 450 to perform one or more location services, navigation services, and/or other services that can utilize GNSS functionality.

In some cases, the communications system 458 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 404 to communicate with a network and/or other UEs.

The vehicle computing system 450 can also include an infotainment system 454 that can control content and one or more output devices of the vehicle 404 that can be used to output the content. The infotainment system 454 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 can include the intelligent transport system (ITS) 455. In some examples, the ITS 455 can be used for implementing V2X communications. For example, an ITS stack of the ITS 455 can generate V2X messages based on information from an application layer of the ITS. In some cases, the application layer can determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 can obtain car access network (CAN) information (e.g., from other components of the vehicle via a CAN bus). In some examples, the communications system 458 (e.g., a TCU NAD) can obtain the CAN information via the CAN bus and can send the CAN information to a PHY/MAC layer of the ITS 455. The ITS 455 can provide the CAN information to the ITS stack of the ITS 455. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 455.

The conditions used to determine whether to generate messages can be determined using the CAN information based on safety-related applications and/or other applications, including applications related to road safety, traffic efficiency, infotainment, business, and/or other applications. In one illustrative example, the ITS 455 can perform lane change assistance or negotiation. For instance, using the CAN information, the ITS 455 can determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 can determine a lane-change condition has been met that is associated with a message to be sent to other vehicles that are nearby the vehicle in the adjacent lane. The ITS 455 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 can use any suitable protocol to generate messages (e.g., V2X messages). Examples of protocols that can be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 455 can be signed by the security layer of the ITS 455. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest—Shamir—Adleman (RSA) and/or other asymmetric encryption algorithm), and/or other encryption-decryption algorithm.

In some examples, the ITS 455 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message can be received by the communications system 458 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 452, which can cause the control system 452 to automatically break the vehicle 404 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 455 can receive a large number of messages from the other UEs (e.g., vehicles, RSUs, etc.), in which case the ITS 455 will authenticate (e.g., decode and decrypt) each of the messages and/or determine which operations to perform. Such a large number of messages can lead to a large computational load for the vehicle computing system 450. In some cases, the large computational load can cause a temperature of the computing system 450 to increase. Rising temperatures of the components of the computing system 450 can adversely affect the ability of the computing system 450 to process the large number of incoming messages. One or more functionalities can be transitioned from the vehicle 404 to another device (e.g., a user device, a RSU, etc.) based on a temperature of the vehicle computing system 450 (or component thereof) exceeding or approaching one or more thermal levels. Transitioning the one or more functionalities can reduce the computational load on the vehicle 404, helping to reduce the temperature of the components. A thermal load balancer can be provided that enable the vehicle computing system 450 to perform thermal based load balancing to control a processing load depending on the temperature of the computing system 450 and processing capacity of the vehicle computing system 450.

The computing system 450 further includes one or more sensor systems 456 (e.g., a first sensor system through an Nth sensor system, where N is a value equal to or greater than 0). When including multiple sensor systems, the sensor system(s) 456 can include different types of sensor systems that can be arranged on or in different parts the vehicle 404. The sensor system(s) 456 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 450 of the vehicle 404.

While the vehicle computing system 450 is shown to include certain components and/or systems, one of ordinary skill will appreciate that the vehicle computing system 450 can include more or fewer components than those shown in FIG. 4. For example, the vehicle computing system 450 can also include one or more input devices and one or more output devices (not shown). In some implementations, the vehicle computing system 450 can also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 5:
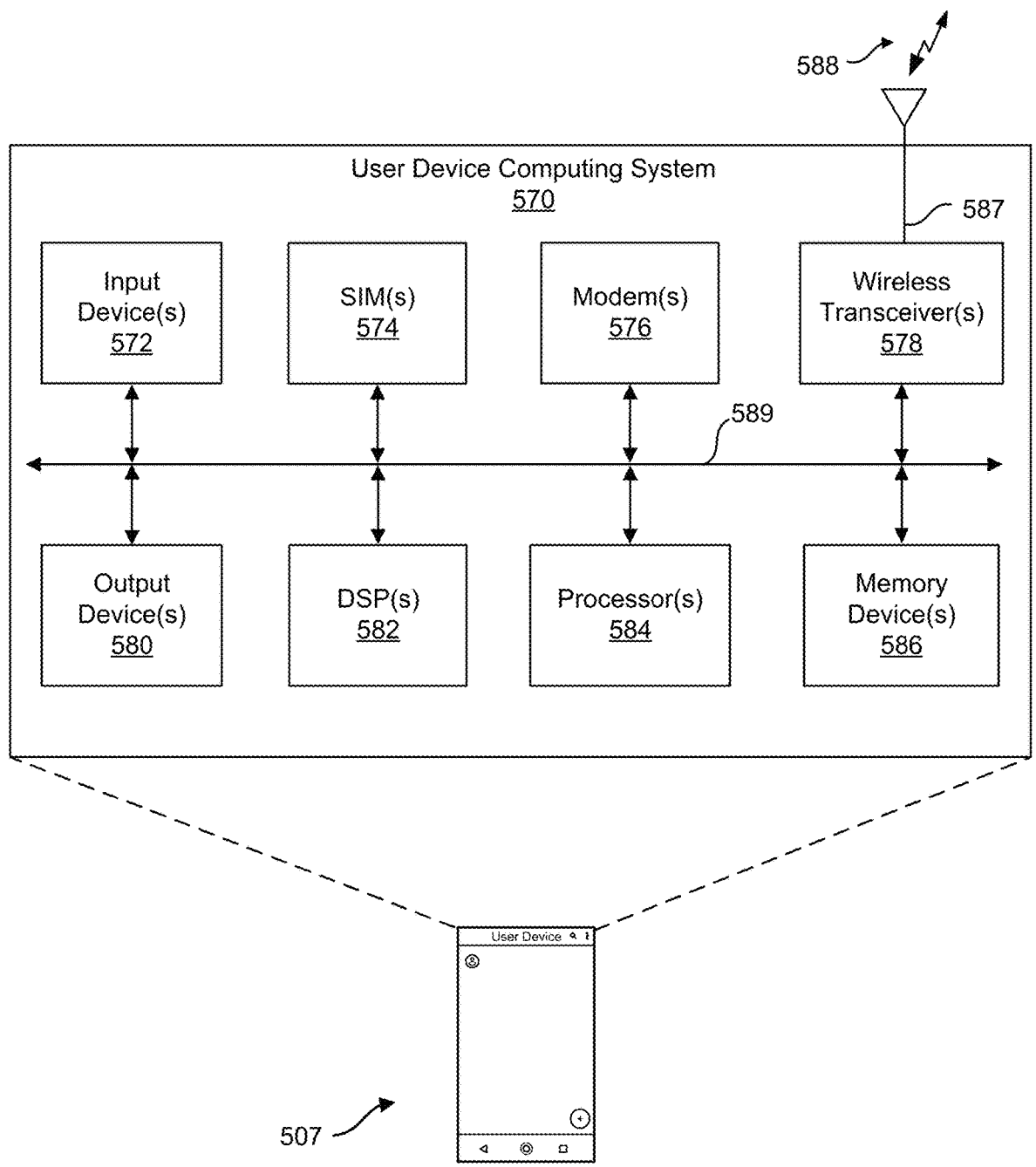
FIG. 5 is a block diagram illustrating an example of a computing system of a user device, in accordance with some aspects of the present disclosure.

FIG. 5 illustrates an example of a computing system 570 of a user device 507. The user device 507 is an example of a UE that can be used by an end-user. For example, the user device 507 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 570 includes software and hardware components that can be electrically or communicatively coupled via a bus 589 (or may otherwise be in communication, as appropriate). For example, the computing system 570 includes one or more processors 584. The one or more processors 584 can include one or more CPUs, ASICs, FPGAs, APs, GPUs, VPUs, NSPs, microcontrollers, dedicated hardware, any combination thereof, and/or other processing device or system. The bus 589 can be used by the one or more processors 584 to communicate between cores and/or with the one or more memory devices 586.

The computing system 570 may also include one or more memory devices 586, one or more digital signal processors (DSPs) 582, one or more SIMS 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

The one or more wireless transceivers 578 can receive wireless signals (e.g., signal 588) via antenna 587 from one or more other devices, such as other user devices, vehicles (e.g., vehicle 404 of FIG. 4 described above), network devices (e.g., base stations such as eNBs and/or gNBs, WiFI routers, etc.), cloud networks, and/or the like. In some examples, the computing system 570 can include multiple antennae. The wireless signal 588 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 588 into a baseband or intermediate frequency and can convert the RF signals to the digital domain.

In some cases, the computing system 570 can include a coding-decoding device (or CODEC) configured to encode and/or decode data transmitted and/or received using the one or more wireless transceivers 578. In some cases, the computing system 570 can include an encryption-decryption device or component configured to encrypt and/or decrypt data (e.g., according to the AES and/or DES standard) transmitted and/or received by the one or more wireless transceivers 578.

The one or more SIMs 574 can each securely store an IMSI number and related key assigned to the user of the user device 507. As noted above, the IMSI and key can be used to identify and authenticate the subscriber when accessing a network provided by a network service provider or operator associated with the one or more SIMs 574. The one or more modems 576 can modulate one or more signals to encode information for transmission using the one or more wireless transceivers 578. The one or more modems 576 can also demodulate signals received by the one or more wireless transceivers 578 in order to decode the transmitted information. In some examples, the one or more modems 576 can include a 4G (or LTE) modem, a 5G (or NR) modem, a modem configured for V2X communications, and/or other types of modems. The one or more modems 576 and the one or more wireless transceivers 578 can be used for communicating data for the one or more SIMs 574.

The computing system 570 can also include (and/or be in communication with) one or more non-transitory machine-readable storage media or storage devices (e.g., one or more memory devices 586), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 586 and executed by the one or more processor(s) 584 and/or the one or more DSPs 582. The computing system 570 can also include software elements (e.g., located within the one or more memory devices 586), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 6:
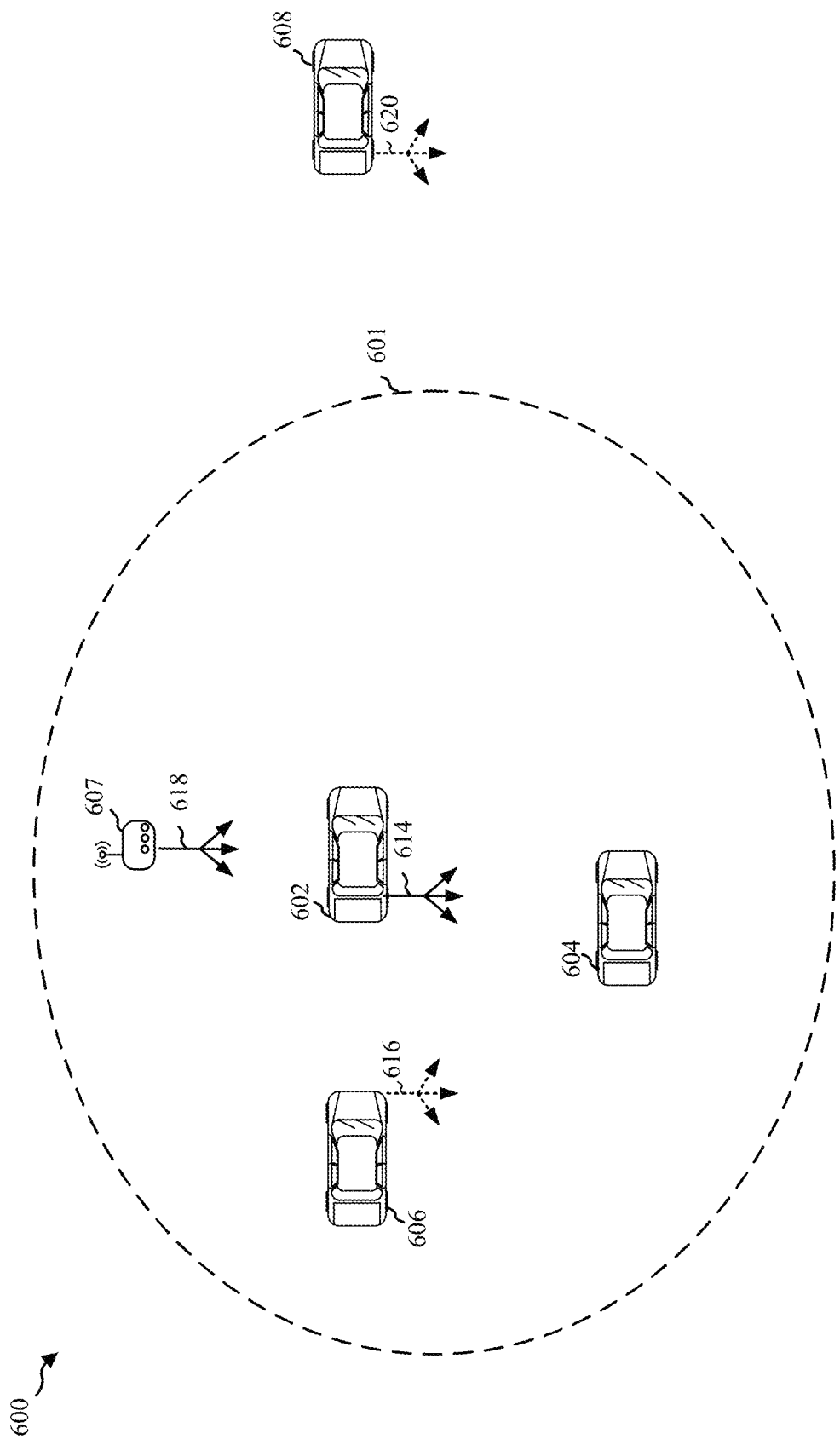
FIG. 6 is a diagram illustrating an example of devices involved in wireless communications (e.g., sidelink communications), in accordance with some aspects of the present disclosure.

FIG. 6 illustrates an example 600 of wireless communication between devices based on sidelink communication, such as V2X or other D2D communication. The communication may be based on a slot structure. For example, transmitting UE 602 may transmit a transmission 614, e.g., comprising a control channel and/or a corresponding data channel, that may be received by receiving UEs 604, 606, 608. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 602, 604, 606, 608 may each be capable of operating as a transmitting device in addition to operating as a receiving device. Thus, UEs 606, 608 are illustrated as transmitting transmissions 616, 620. The transmissions 614, 616, 620 (and 618 by RSU 607) may be broadcast or multicast to nearby devices. For example, UE 614 may transmit communication intended for receipt by other UEs within a range 601 of UE 614. Additionally/alternatively, RSU 607 may receive communication from and/or transmit communication 618 to UEs 602, 604, 606, 608. UE 602, 604, 606, 608 or RSU 607 may comprise a detection component. UE 602, 604, 606, 608 or RSU 607 may also comprise a BSM or mitigation component.

Figure 7A:
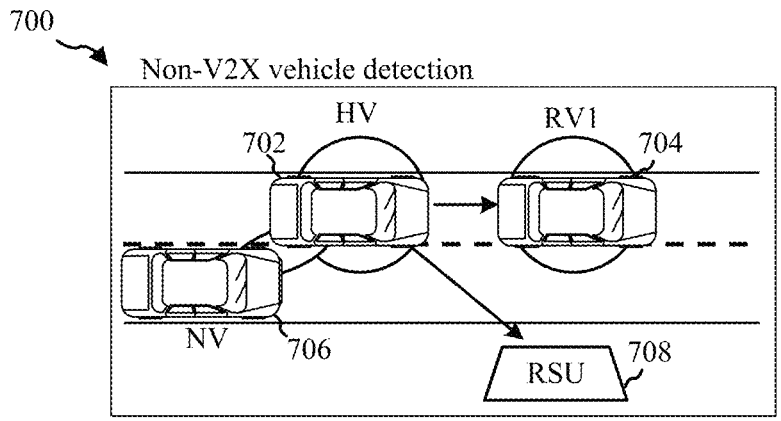
FIGS. 7A-7D are diagrams illustrating examples of sensor-sharing for cooperative and automated driving systems, in accordance with some aspects of the present disclosure.
Figure 7B:
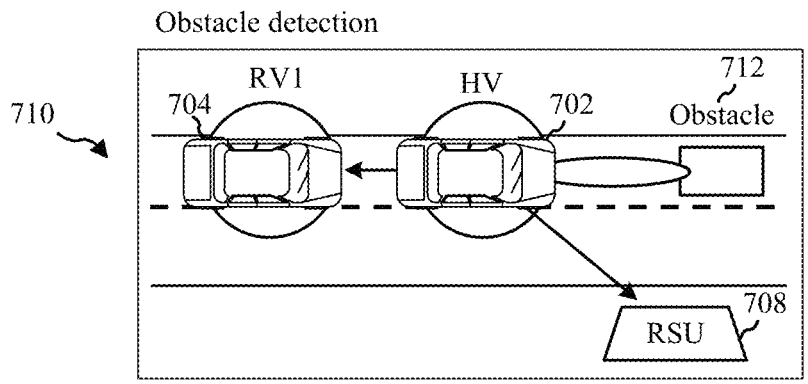
Figure 7C:
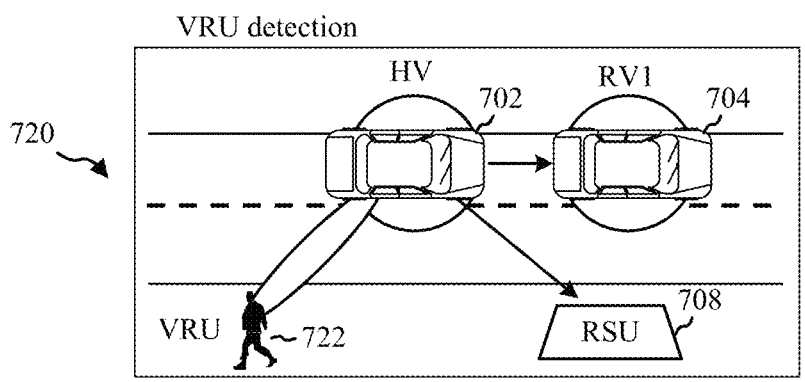
Figure 7D:
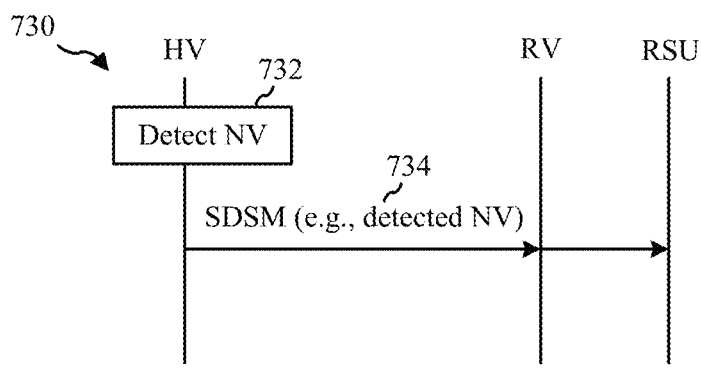
Figure 8:
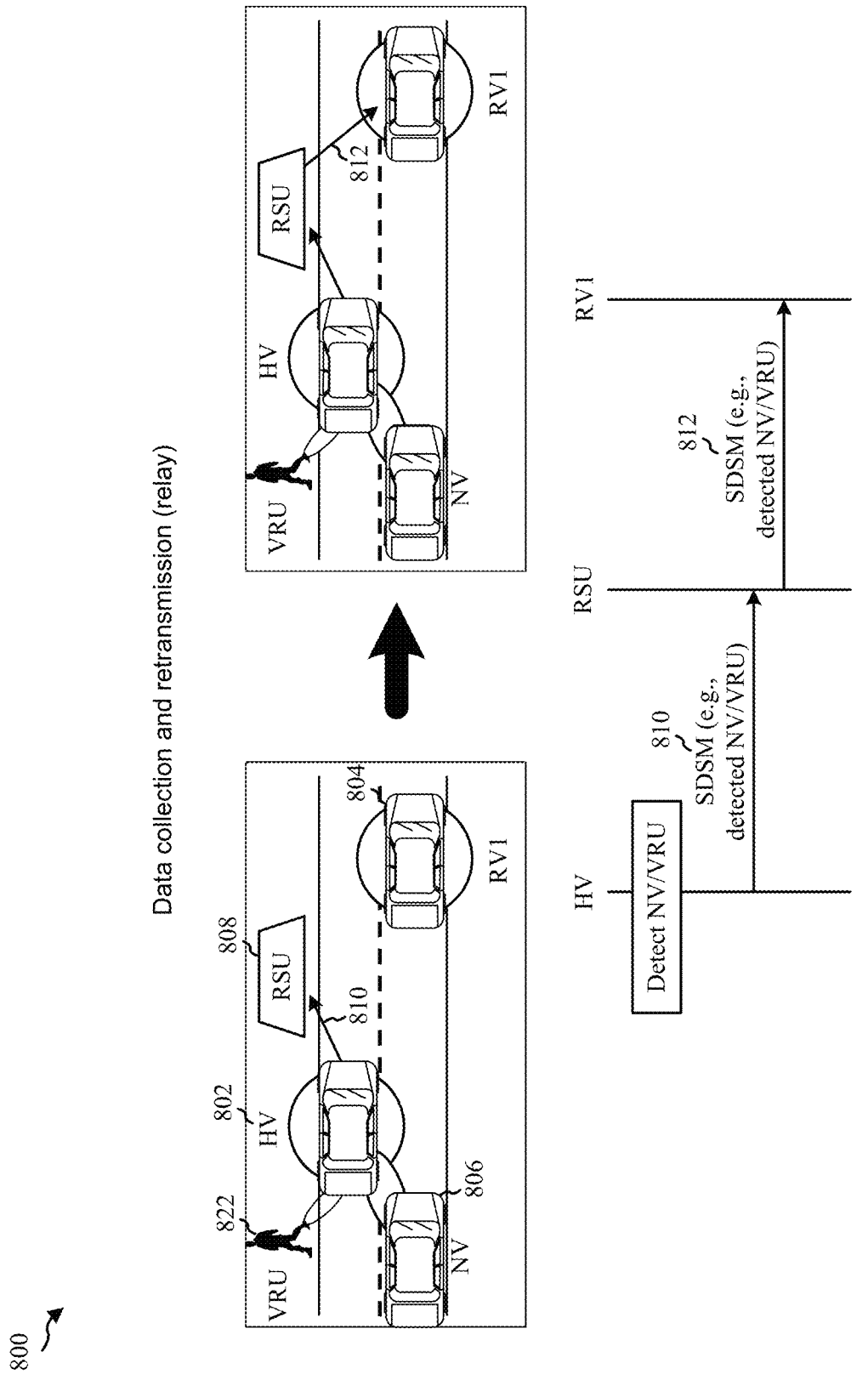
FIG. 8 is a diagram illustrating an example of sensor-sharing for cooperative and automated driving systems, in accordance with some aspects of the present disclosure.

In wireless communications, such as V2X communications, V2X entities may perform sensor sharing with other V2X entities for cooperative and automated driving. For example, with reference to diagram 700 of FIG. 7A, the host vehicle (HV) 702 may detect a number of items within its environment. For example, the HV 702 may detect the presence of the non-V2X entity (NV) 706 at block 732. The HV 702 may inform other entities, such as a first remote vehicle (RV1) 704 or a road side unit (RSU) 708, about the presence of the NV 706, if the RV1 704 and/or the RSU 708, by themselves, are unable to detect the NV 706. The HV 702 informing the RV1 704 and/or the RSU 708 about the NV 706 is a sharing of sensor information. With reference to diagram 710 of FIG. 7B, the HV 702 may detect a physical obstacle 712, such as a pothole, debris, or an object that may be an obstruction in the path of the HV 702 and/or RV1 704 that has not yet been detected by RV1 704 and/or RSU 708. The HV 702 may inform the RV1 and/or the RSU 708 of the obstacle 712, such that the obstacle 712 may be avoided. With reference to diagram 720 of FIG. 7C, the HV 702 may detect the presence of a vulnerable road user (VRU) 722 and may share the detection of the VRU 722 with the RV1 704 and the RSU 708, in instances where the RSU 708 and/or RV1 704 may not be able to detect the VRU 722. With reference to diagram 730 of FIG. 7D, the HV, upon detection of a nearby entity (e.g., NV, VRU, obstacle) may transmit a sensor data sharing message (SDSM) 734 to the RV and/or the RSU to share the detection of the entity. The SDSM 734 may be a broadcast message such that any receiving device within the vicinity of the HV may receive the message. In some instances, the shared information may be relayed to other entities, such as RVs. For example, with reference to diagram 800 of FIG. 8, the HV 802 may detect the presence of the NV 806 and/or the VRU 822. The HV 802 may broadcast the SDSM 810 to the RSU 808 to report the detection of NV 806 and/or VRU 822. The RSU 808 may relay the SDSM 810 received from the HV 802 to remote vehicles such that the remote vehicles are aware of the presence of the NV 806 and/or VRU 822. For example, the RSU 808 may transmit an SDSM 812 to the RV1 804, where the SDSM 812 includes information related to the detection of NV 806 and/or VRU 822.

Figure 9:
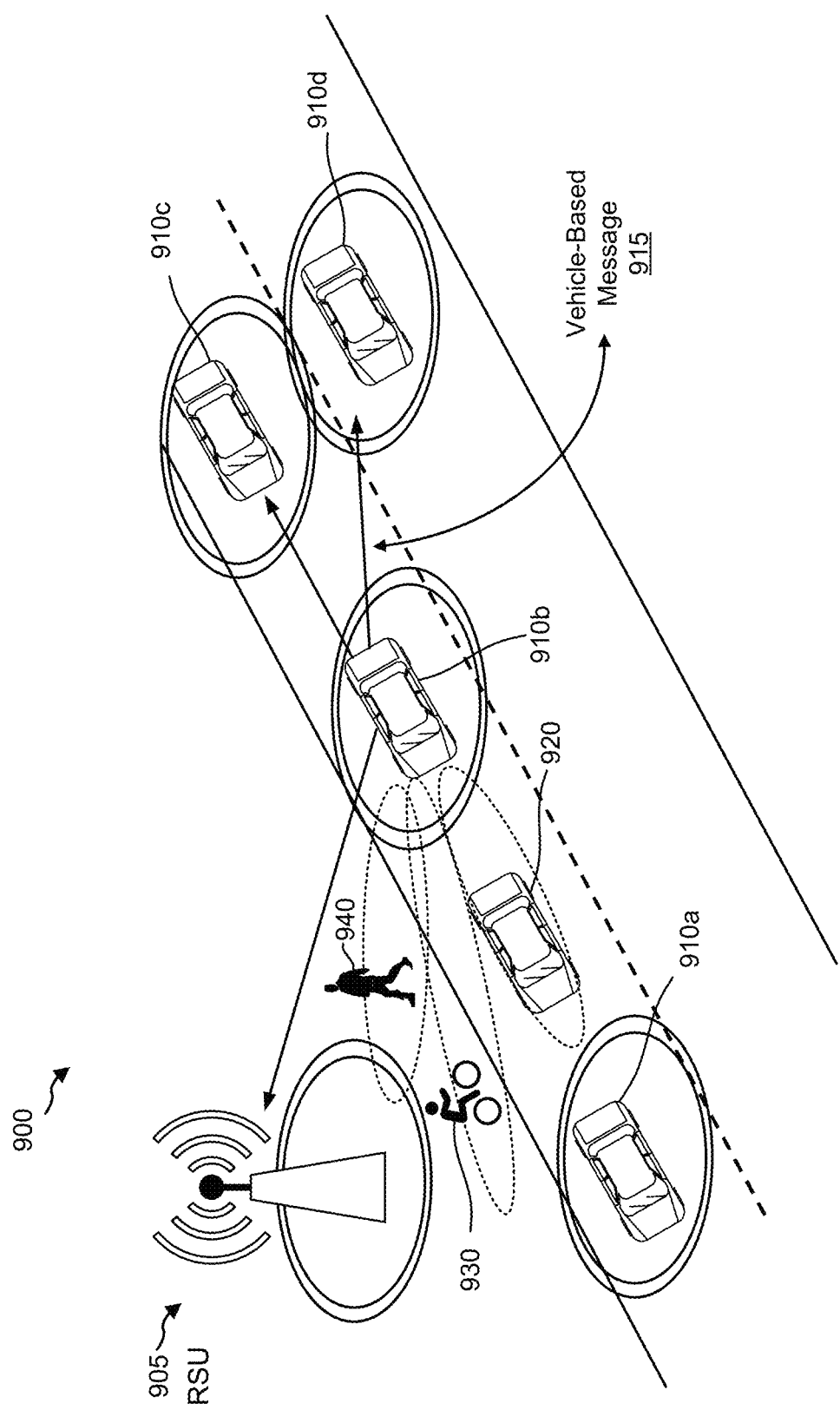
FIG. 9 is a diagram illustrating an example of a system for sensor sharing in wireless communications (e.g., V2X communications), in accordance with some aspects of the present disclosure.

FIG. 9 is a diagram illustrating an example of a system 900 for sensor sharing in wireless communications (e.g., V2X communications), in accordance with some aspects of the present disclosure. In FIG. 9, the system 900 is shown to include a plurality of equipped (e.g., V2X capable) network devices. The plurality of equipped network devices includes vehicles (e.g., automobiles) 910*a*, 910*b*, 910*c*, 910*d*, and an RSU 905. Also shown are a plurality of non-equipped network devices, which include a non-equipped vehicle 920, a VRU (e.g., a bicyclist) 930, and a pedestrian 940. The system 900 may comprise more or less equipped network devices and/or more or less non-equipped network devices, than as shown in FIG. 9. In addition, the system 900 may comprise more or less different types of equipped network devices (e.g., which may include equipped UEs) and/or more or less different types of non-equipped network devices (e.g., which may include non-equipped UEs) than as shown in FIG. 9. In addition, in one or more examples, the equipped network devices may be equipped with heterogeneous capability, which may include, but is not limited to, C-V2X/DSRC capability, 4G/5G cellular connectivity, GPS capability, camera capability, radar capability, and/or LIDAR capability.

The plurality of equipped network devices may be capable of performing V2X communications. In addition, at least some of the equipped network devices are configured to transmit and receive sensing signals for radar (e.g., RF sensing signals) and/or LIDAR (e.g., optical sensing signals) to detect nearby vehicles and/or objects. Additionally or alternatively, in some cases, at least some of the equipped network devices are configured to detect nearby vehicles and/or objects using one or more cameras (e.g., by processing images captured by the one or more cameras to detect the vehicles/objects). In one or more examples, vehicles 910*a*, 910*b*, 910*c*, 910*d* and RSU 905 may be configured to transmit and receive sensing signals of some kind (e.g., radar and/or LIDAR sensing signals).

In some examples, some of the equipped network devices may have higher capability sensors (e.g., GPS receivers, cameras, RF antennas, and/or optical lasers and/or optical sensors) than other equipped network devices of the system 900. For example, vehicle 910*b* may be a luxury vehicle and, as such, have more expensive, higher capability sensors than other vehicles that are economy vehicles. In one illustrative example, vehicle 910*b* may have one or more higher capability LIDAR sensors (e.g., high capability optical lasers and optical sensors) than the other equipped network devices in the system 900. In one illustrative example, a LIDAR of vehicle 910*b* may be able to detect a VRU (e.g., cyclist) 930 and/or a pedestrian 940 with a large degree of confidence (e.g., a seventy percent degree of confidence). In another example, vehicle 910*b* may have higher capability radar (e.g., high capability RF antennas) than the other equipped network devices in the system 900. For instance, the radar of vehicle 910*b* may be able to detect the VRU (e.g., cyclist) 930 and/or pedestrian 940 with a degree of confidence (e.g., an eight-five percent degree of confidence). In another example, vehicle 910*b* may have higher capability camera (e.g., with higher resolution capabilities, higher frame rate capabilities, better lens, etc.) than the other equipped network devices in the system 900.

During operation of the system 900, the equipped network devices (e.g., RSU 905 and/or at least one of the vehicles 910*a*, 910*b*, 910*c*, 910*d*) may transmit and/or receive sensing signals (e.g., RF and/or optical signals) to sense and detect vehicles (e.g., vehicles 910*a*, 910*b*, 910*c*, 910*d*, and 920) and/or objects (e.g., VRU 930 and pedestrian 940) located within and surrounding the road. The equipped network devices (e.g., RSU 905 and/or at least one of the vehicles 910*a*, 910*b*, 910*c*, 910*d*) may then use the sensing signals to determine characteristics (e.g., motion, dimensions, type, heading, and speed) of the detected vehicles and/or objects. The equipped network devices (e.g., RSU 905 and/or at least one of the vehicles 910*a*, 910*b*, 910*c*, 910*d*) may generate at least one vehicle-based message 915 (e.g., a V2X message, such as a Sensor Data Sharing Message (SDSM), a Basic Safety Message (BSM), a Cooperative Awareness Message (CAM), Collective Perception Messages (CPMs), and/or other type of message) including information related to the determined characteristics of the detected vehicles and/or objects.

The vehicle-based message 915 may include information related to the detected vehicle or object (e.g., a position of the vehicle or object, an accuracy of the position, a speed of the vehicle or object, a direction in which the vehicle or object is traveling, and/or other information related to the vehicle or object), traffic conditions (e.g., low speed and/or dense traffic, high speed traffic, information related to an accident, etc.), weather conditions (e.g., rain, snow, etc.), message type (e.g., an emergency message, a non-emergency or "regular" message), etc.), road topology (line-of-sight (LOS) or non-LOS (NLOS), etc.), any combination, thereof, and/or other information. In some examples, the vehicle-based message 915 may also include information regarding the equipped network device's preference to receive vehicle-based messages from other certain equipped network devices. In some cases, the vehicle-based message 915 may include the current capabilities of the equipped network device (e.g., vehicles 910*a*, 910*b*, 910*c*, 910*d*), such as the equipped network device's sensing capabilities (which can affect the equipped network device's accuracy in sensing vehicles and/or objects), processing capabilities, the equipped network device's thermal status (which can affect the vehicle's ability to process data), and the equipped network device's state of health.

In some aspects, the vehicle-based message 915 may include a dynamic neighbor list (also referred to as a Local Dynamic Map (LDM) or a dynamic surrounding map) for each of the equipped network devices (e.g., vehicles 910a, 910b, 910c, 910d and RSU 905). For example, each dynamic neighbor list can include a listing of all of the vehicles and/or objects that are located within a specific predetermined distance (or radius of distance) away from a corresponding equipped network device. In some cases, each dynamic neighbor list includes a mapping, which may include roads and terrain topology, of all of the vehicles and/or objects that are located within a specific predetermined distance (or radius of distance) away from a corresponding equipped network device.

In some implementations, the vehicle-based message 915 may include a specific use case or safety warning, such as a do-not-pass warning (DNPW) or a forward collision warning (FCW), related to the current conditions of the equipped network device (e.g., vehicles 910a, 910b, 910c, 910d). In some examples, the vehicle-based message 915 may be in the form of a standard Basic Safety Message (BSM), a Cooperative Awareness Message (CAM), a Collective Perception Message (CPM), a Sensor Data Sharing Message (SDSM) (e.g., SAE J3224 SDSM), and/or other format.

Figure 10:
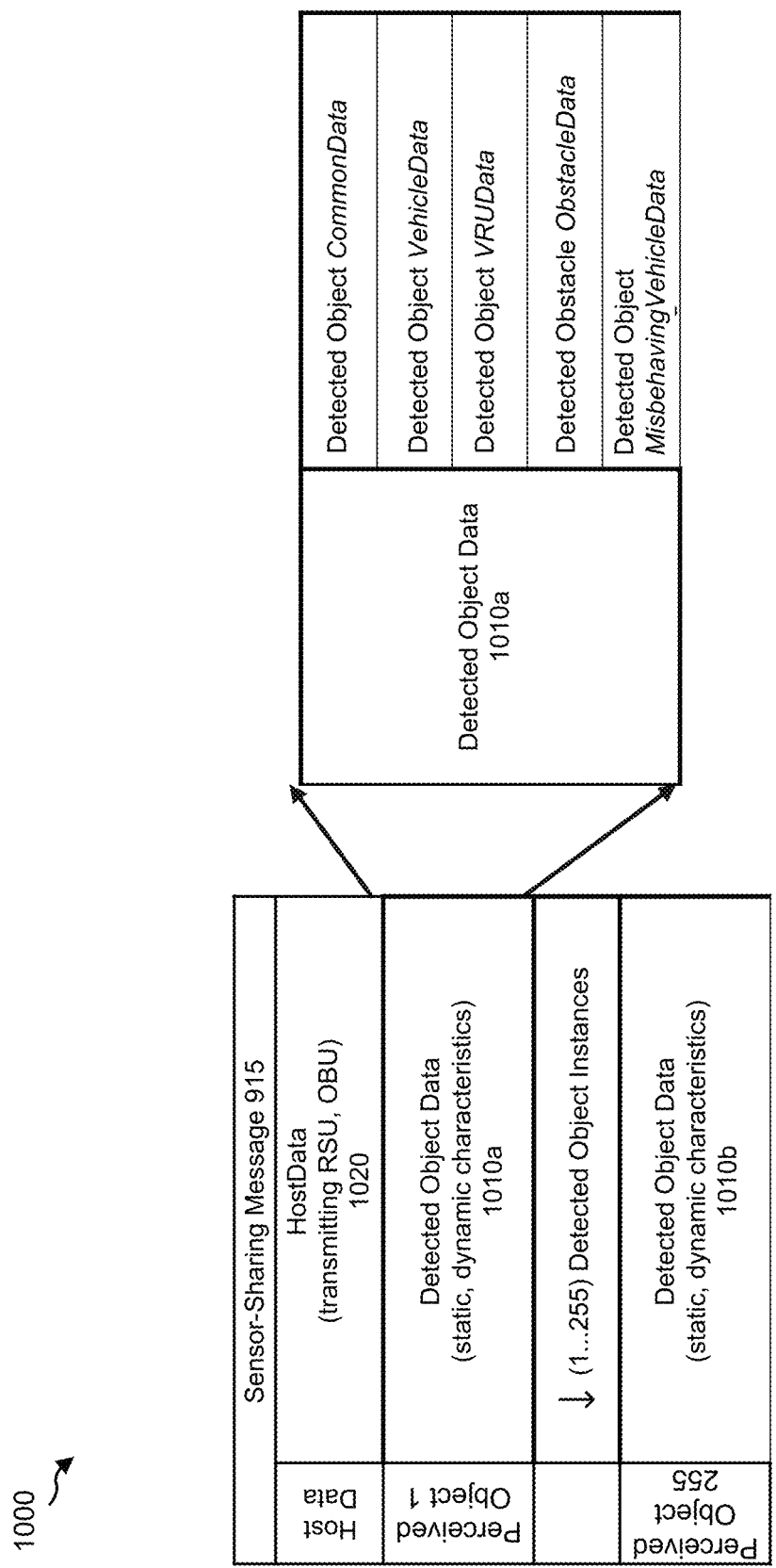
FIG. 10 is a diagram illustrating an example of a vehicle-based message (shown as a sensor-sharing message), in accordance with some aspects of the present disclosure.

FIG. 10 is a diagram 1000 illustrating an example of a vehicle-based message (e.g., vehicle-based message 915 of FIG. 9), in accordance with some aspects of the present disclosure. The vehicle-based message 915 is shown as a sensor-sharing message (e.g., an SDSM), but can include a BSM, a CAM, a CPM, or other vehicle-based message as noted herein. In FIG. 10, the vehicle-based message 915 is shown to include HostData 1020 and Detected Object Data 1010a, 1010b. The HostData 1020 of the vehicle-based message 915 may include information related to the transmitting device (e.g., the transmitting equipped network entity, such as RSU 905 or an onboard unit (OBU), such as on vehicles 910a, 910b, 910c, 910d) of the vehicle-based message 915. The Detected Object Data 1010a, 1010b of the vehicle-based message 915 may include information related to the detected vehicle or object (e.g., static or dynamic characteristics related to the detected vehicle or object, and/or other information related to the detected vehicle or object). The Detected Object Data 1010a, 1010b may specifically include Detected Object CommonData, Detected Object VehicleData, Detected Object VRUData, Detected Obstacle ObstacleData, and Detected Object MisbehavingVehicleData.

These vehicle-based messages 915 are beneficial because they can provide an awareness and understanding to the equipped network devices (e.g., vehicles 910a, 910b, 910c, 910d of FIG. 9) of upcoming potential road dangers (e.g., unforeseen oncoming vehicles, accidents, and road conditions).

As previously mentioned, a transmitting network device (e.g., a V2X-capable vehicle that generates and sends vehicle-based messages) can be misbehaving (e.g., operating as a misbehaving vehicle) by sending (e.g., either purposely or not purposely) vehicle-based messages containing incorrect (wrong) information. For example, a transmitting network device can be operating as a misbehaving vehicle, if the information contained within its vehicle-based messages identifies an incorrect position (location) for the transmitting network device.

In one or more cases, a transmitting network device (e.g., a V2X-capable vehicle that generates and sends vehicle-based messages) can be misbehaving (e.g., operating as a misbehaving vehicle) by operating as an attacker by creating a non-visible, V2X ghost object to disturb traffic on the road. A ghost V2X object is a V2X object (e.g., an object perceived by V2X sensors) that is not located at the position (location) as indicated by the transmitting network device. Ghost V2X objects are objects with no physical existence, such as a simulated vulnerable road user (VRU) or a simulated vehicle. A non-visible object is an object that is out of a sensor field-of-view (FoV) or not in the line-of-sight (LoS) (e.g., a non-line of sight scenario) of a receiving network device (e.g., a V2X-capable vehicle that receives vehicle-based messages).

In some cases, an attacker can use V2X attacks that may only be detectable by sensors. For example, an attacker may create ghost vehicles that mimic real vehicles. In another example, an attacker may include false traffic light information (e.g., stating that, at certain time, a traffic light is illuminated red, when the traffic light is actually illuminated green) in a vehicle-based message. The aim of an attacker can be to cause the driver to perform unnecessary maneuvers (e.g., decelerating), which can result in frustration to the driver, and cause a disruption to traffic, which can result in a traffic jam and/or a vehicle collision. Attacks that mimic the mobility of vehicles can be difficult to detect without the use of sensors (e.g., cameras, radar, and LIDAR).

Figure 11:
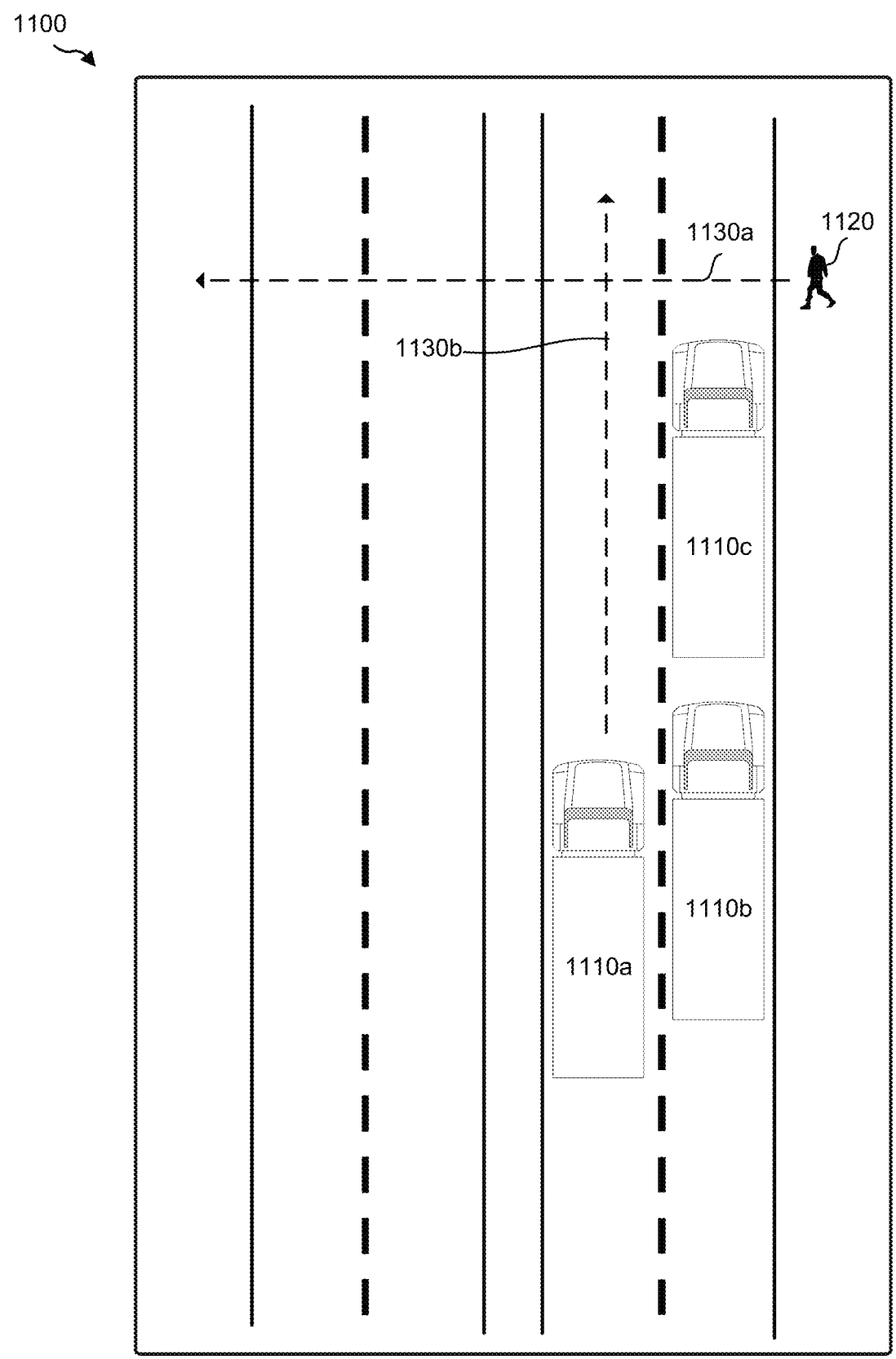
FIG. 11 is a diagram illustrating an example of a vehicle configuration for a non-line of sight (NLoS) scenario, in accordance with some aspects of the present disclosure.

FIG. 11 is a diagram illustrating an example of a vehicle configuration 1100 for a non-line of sight (NLoS) scenario, in accordance with some aspects of the present disclosure. In FIG. 11, several equipped (e.g., V2X capable) network devices 1110a, 1110b, 1110c in the form of trucks are shown. FIG. 11 also shows a non-equipped (e.g., not V2X capable) object 1120 in the form of a pedestrian.

In FIG. 11, the equipped network devices 1110a, 1110b, 1110c (e.g., trucks) are all shown to be driving in the same direction on the road. In particular, equipped network device 1110a (e.g., a truck) is shown to be driving in the direction of line 1130b. The non-equipped object 1120 (e.g., pedestrian) is shown to be beginning to cross the road in the direction of line 1130a. As such, paths of the equipped network device 1110a (e.g., a truck) and the non-equipped object 1120 (e.g., pedestrian) should cross where the two lines 1130a, 1130b cross on the road.

The equipped network device 1110a (e.g., a truck) may not be aware of the non-equipped object 1120 (e.g., pedestrian) because the non-equipped object 1120 (e.g., pedestrian) is not in the line of sight (NLoS) (e.g., not within the FoV) of sensors on the equipped network device 1110a (e.g., truck). In some cases, an attacker (e.g., a vehicle) may a transmit a vehicle-based message (e.g., a BSM or CAM) to the equipped network device 1110a (e.g., a truck) notifying the equipped network device 1110a (e.g., truck) of the non-equipped object 1120 (e.g., pedestrian) heading in the direction of the line 1130a. However, since the non-equipped object 1120 (e.g., pedestrian) is located in the NLoS of the equipped network device 1110a (e.g., a truck), the sensors of the equipped network device 1110a (e.g., a truck) are not able to sense the non-equipped object 1120 (e.g., pedestrian) to verify whether the non-equipped object 1120 (e.g., pedestrian) has a physical existence or is merely a ghost object.

As previously mentioned, current V2X-sensor solutions are insufficient to detect certain, multiple V2X attacks. For example, current solutions may only scan for a single type of message (e.g., a CAM or a BSM), while an attacker may target multiple message types. For another example, current solutions may only rely on a single detector (e.g., a ghost-V2X detector) and, as such, these current solutions can only detect a single V2X attack.

In one or more aspects, systems and techniques are provided for optimizing situational awareness of vehicle misbehavior, which can lead to a disruption in traffic. The systems and techniques provide a V2X-sensor misbehavior detection system that can utilize information from sensors (e.g., cameras, radar, and LIDAR) to verify (confirm) information (e.g., vehicle and/or traffic infrastructure information) contained within vehicle-based messages (e.g., V2X messages). In one or more aspects, the disclosed system may include a plurality of processes (e.g., for detectors), which may include, but are not limited to, data alignment, data association, misbehavior reporting, objection detection (e.g., via sensors), spatial and temporal alignment, and estimation probabilities for LoS and NLoS objects.

In some aspects, the systems and techniques can provide V2X-sensor detectors as well as a management system for the V2X-sensor detectors. The systems and techniques can also provide an interaction between a misbehavior detection system (MBDS) and V2X-sensor detectors, as well as an interaction between sensor fusion and V2X-sensor detectors. The systems and techniques can be implemented as part of a network device, such as a vehicle.

Figure 12:
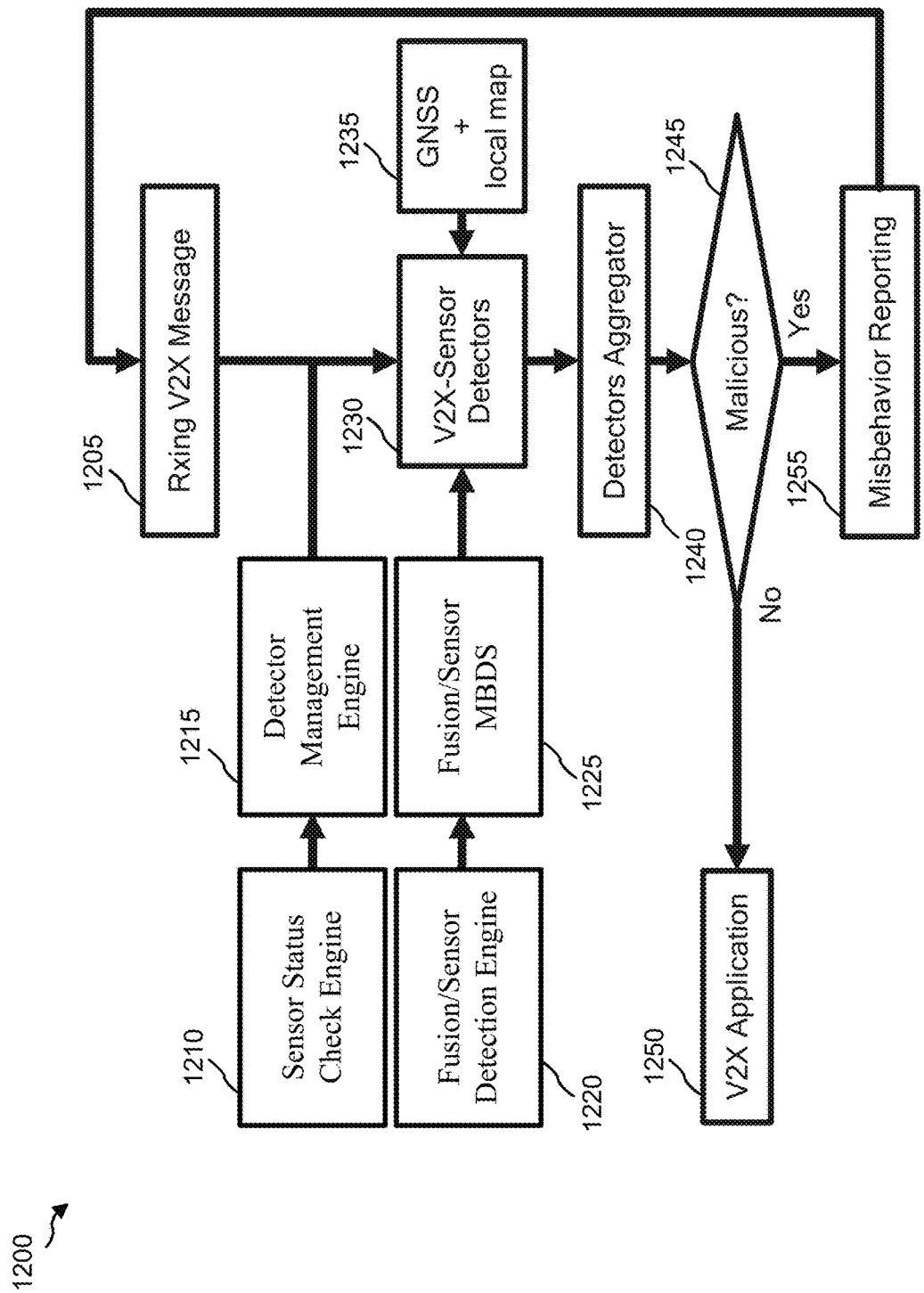
FIG. 12 is a diagram illustrating an example of operations that can be performed by a V2X-sensor misbehavior detection system, in accordance with some aspects of the present disclosure.

FIG. 12 is a diagram 1200 illustrating an example of operations that can be performed by a V2X-sensor misbehavior detection system of a network device, such as a vehicle. For example, the diagram 1200 illustrates operations performed by the management system for the V2X-sensor detectors (e.g., detector management engine 1215). The diagram 1200 also illustrates interactions between the MBDS (e.g., fusion/sensor MBDS 1225) and the V2X-sensor detectors (e.g., V2X-sensor detectors 1230), and the sensor fusion (e.g., fusion/sensor detection engine 1220) and the V2X-sensor detectors (e.g., V2X-sensor detectors 1230). For the diagram 1200 of FIG. 12, a V2X message is received at block 1205.

As shown in the diagram 1200 of FIG. 12, a sensor status check engine 1210, can update and/or check (e.g., periodically update and/or check) the status of one or more sensors of the network device (e.g., a vehicle). For example, the sensor status can depend upon whether a sensor of the network device is broken or blinded, and/or can depend upon whether the weather (e.g., fog or rain) can cause limited sensing capabilities for the sensor. For example, checking the color of a traffic light contained within a vehicle-based message (e.g., a V2X message) may not be possible without the use of a working camera (as an example of a sensor).

In some cases, depending upon the sensor status, a sensor (or the sensor status check engine 1210) may create a configuration file, which can include a confidence level for the sensing capabilities of the sensor (e.g., for successfully sensing within a specific sensing range, such as a 50 meter range). The confidence level for a sensor can depend upon the type of sensor.

For example, unlike performance of a camera, performance of a radar sensor may not be affected by fog. In some cases, the confidence level for a sensor can vary from 0% (e.g., for no confidence in the sensing capability of the sensor for a particular range, such as a 50 meter range) to 100% (e.g., for complete confidence in the sensing capability of the sensor for a particular range, such as a 50 meter range). The configuration file can be sent to the detector management engine 1215.

After the detector management engine 1215 receives the configuration file from the sensor (or the sensor status check engine 1210), the detector management engine 1215 can be aware of the sensing capabilities of the sensor and can apply a weight to sensor data (or sensing information) obtained from that sensor based on the confidence level (e.g., 80%) for that sensor. For example, if the configuration file indicates that the sensor has a zero confidence level (e.g., 0%) for sensing in a particular range (e.g., a 50 meter range), the detector management engine 1215 may assign a weight of zero (0) to sensor data received from that sensor and, as such, that the sensor data may not be utilized by the V2X-sensor detectors 1230. As such, depending upon the confidence level of the configuration file for a sensor, the detector management engine 1215 can control (e.g., by changing detector parameters) how the V2X-sensor detectors 1230 perceive the sensor data obtained from the sensor.

In one or more cases, the detector management engine 1215 can change the parameters of the V2X-sensor detectors 1230 (e.g., detector parameters). For example, the detector management engine 1215 can change the maximum detection range of the sensor fusion (e.g., the range of sensor data collected by the fusion/sensor detection engine 1220) and/or the maximum bearing angle for the sensor fusion (e.g., the maximum bearing angle of the sensor for sensor data collected by the fusion/sensor detection engine 1220). In some cases, for example in extreme weather conditions where the sensor has a zero confidence level (e.g., 0%) for sensing in a particular range (e.g., a 50 meter range), the detector management engine 1215 can simply disable the sensor from sensing (e.g., disable the sensor from obtaining sensor data).

The fusion/sensor detection engine 1220 can collect (e.g., performs "fusion") the sensor data from at least one sensor (e.g., from a plurality of sensors) that is obtained for a particular scene. By collecting sensor data from multiple sensors for a particular scene, rather than collecting sensor data from a single sensor for a particular scene, allows for the detection of a scene, even if one sensor fails. After the fusion/sensor detection engine 1220 collects (e.g., performs "fusion") the sensor data from at least one sensor for a particular scene, the fusion/sensor detection engine 1220 can send this collected sensor data to the fusion sensor/sensor MBDS 1225.

After the fusion sensor/sensor MBDS 1225 receives the sensor data from the fusion/sensor detection engine 1220, the fusion sensor/sensor MBDS 1225 can detect and remove simulated sensor objects (e.g., fake sensor objects) contained within the sensor data (e.g., by filtering out information or data associated with the simulated or face sensor objects from the sensor data). For example, a simulated (fake) pedestrian may simply be an image (e.g., picture) of a pedestrian projected (displayed) on the on the road. The fusion sensor/sensor MBDS 1225 can remove any detected simulated (fake) objects in the sensor data. The removal of the simulated (fake) objects in the sensor data can allow for a reduction in false assumptions of objects existing made according to the sensor data. After the fusion sensor/sensor MBDS 1225 removes any detected simulated (fake) objects in the sensor data, the fusion sensor/sensor MBDS 1225 can send the filtered out sensor data to the V2X-sensor detectors 1230.

The V2X-sensor detectors 1230 can receive the V2X message at block 1205, the detector parameters from the detector management engine 1215, the filtered out sensor data from the fusion sensor/sensor MBDS 1225, and in some cases a map. The map may include Global Navigation Satellite system (GNSS) data and a local map 1235. After the V2X-sensor detectors 1230 receive these inputs, the V2X-sensor detectors 1230 can analyze (compare) these inputs to determine if there is malicious behavior (e.g., incorrect information contained within a V2X message). In one or more aspects, the V2X-sensor detectors 1230 may include a plurality of different detectors, which may include, but are not limited to, the detector for detecting ghost objects of FIG. 13, the detector for detecting simulated (fake) free space of FIG. 15, and the detector for detecting an inconsistent number of CPM objects of FIG. 18.

After the V2X-sensor detectors 1230 analyze (compare) the inputs to determine if there is malicious behavior, the V2X-sensor detectors 1230 can send their results to a detectors aggregator 1240. The detectors aggregator 1240 can aggregate (combine) the received results from the V2X-sensor detectors 1230. Then, depending upon the aggregated results, it can be determined (e.g., by at least one processor) whether or not malicious behavior has been detected at block 1245. If it is determined that malicious behavior has not been detected, then the V2X application can proceed at block 1250. However, if it is determined that malicious behavior has been detected, then the detected misbehavior may be reported at block 1255, such as within a misbehavior report (MBR), to a misbehavior server of a misbehavior authority.

Figure 13:
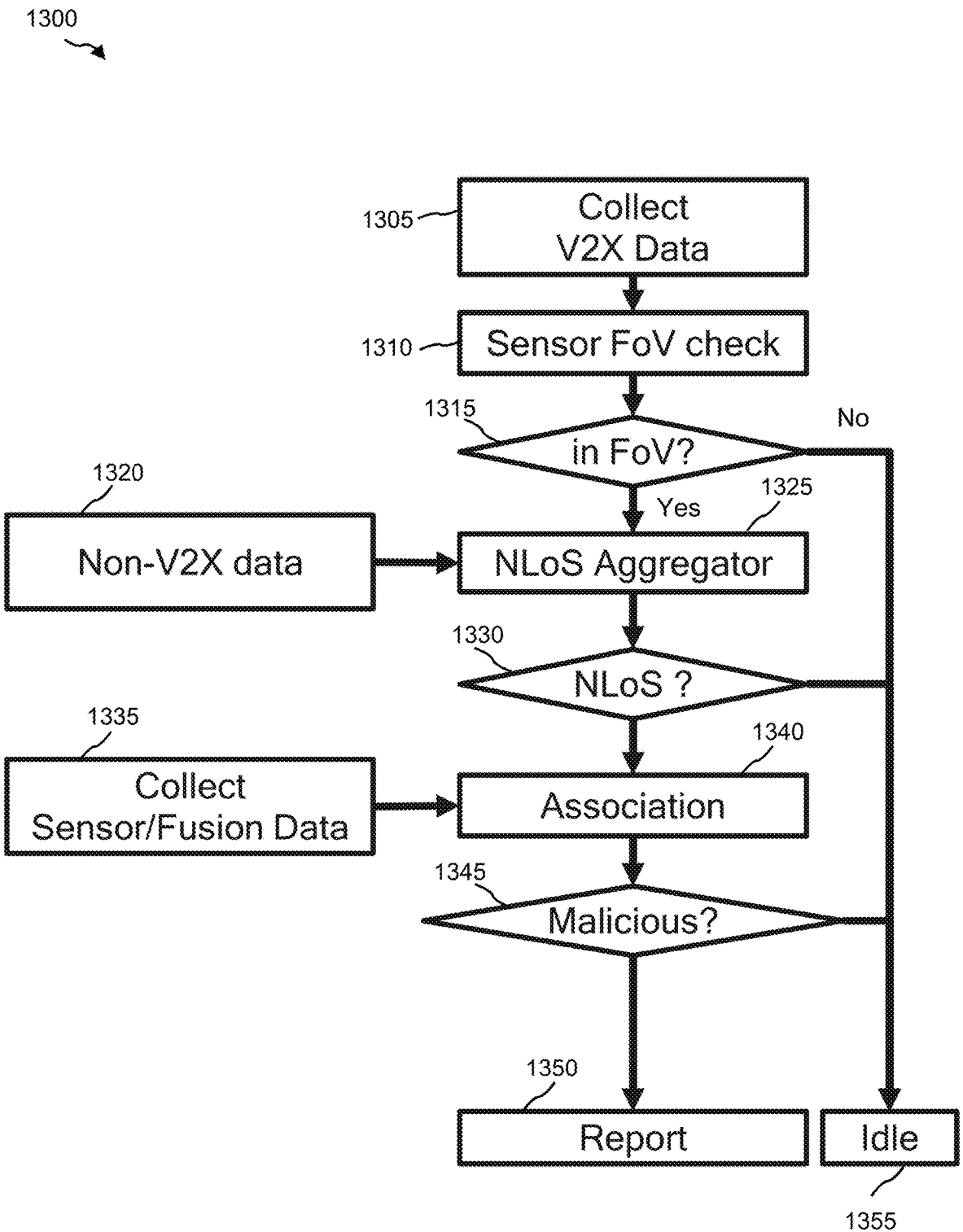
FIG. 13 is a flow chart illustrating an example of a process for operation of a detector for detecting ghost objects using sensors, where the detector may be employed for the V2X-sensor detectors of FIG. 12, in accordance with some aspects of the present disclosure.

FIG. 13 is a flow chart illustrating an example of a process 1300 for operation of a detector for detecting ghost objects using sensors, where the detector may be employed for the V2X-sensor detectors 1230 of FIG. 12. In the process 1300 of FIG. 13, the detector can collect the V2X data (e.g., information contained within a V2X message) at block 1305. After the detector collects the V2X data, the detector can check for sensor FoV at block 1310 to determine whether a V2X object (e.g., within the collected V2X data) can be detected by the sensor (e.g., whether the V2X object is located within the sensor's FoV, which may be defined by X and Y coordinates as well as a Z coordinate, such as altitude). If the detector determines that the V2X object is not located within the sensor's FoV (a no decision at block 1315), the detector can simply remain idle 1355.

However, if the detector determines that the V2X object is located within the sensor's FoV (a yes decision at block 1315), a NLoS aggregator 1325 can aggregate the collected V2X data with non-V2X data 1320 (e.g., map information related to the V2X object). After the NLoS aggregator 1325 has aggregated the data, the detector can determine whether the V2X object is located in NLoS of the sensor at block 1330. If the detector determines that the V2X object is located in NLoS of the sensor, then the detector can simply remain idle at block 1355.

At block 1335, the detector can collect sensor/fusion data (e.g., sensor data from at least one sensor for a particular scene related to the V2X object). If the detector determines that the V2X object is not located in NLoS of the sensor, then the detector, by using the collected sensor/fusion data, can determine whether there is an association (at block 1340) between a sensor object (e.g., within the collected sensor/fusion data) and the V2X object (e.g., whether a sensor object validates the existence of the V2X object).

Then, the detector may determine whether malicious behavior has been detected at block 1345 (e.g., there is malicious behavior when there is no sensor object that can validate the existence of the V2X object). If the detector determines that there is no malicious behavior detected (e.g., there is a sensor object that can validate the existence of the V2X object), the detector can simply remain idle 1355. However, if the determines that there is malicious behavior detected (e.g., there is no sensor object that can validate the existence of the V2X object), the detector can generate a misbehavior report 1350 that reports the misbehavior (e.g., ghost object).

In one or more aspects, the NLoS aggregator 1325 may rely on a set of techniques to determine whether the V2X object is located within the NLoS or LoS of the sensors of the equipped (e.g., V2X capable) network device (e.g., vehicle). The output of the NLoS aggregator 1325 may be based on aggregating the output from each NLoS technique. In some cases, an aggregation technique may be a majority vote.

The techniques utilized by the NLoS aggregator 1325 may include computational geometry techniques. As previously mentioned, estimation probabilities for LoS and NLoS objects can be used to estimate whether a LoS path is blocked by another vehicle by using, for example, a local dynamic map (e.g., an embedded map) and a calculation of a three-dimensional LoS. For estimating whether a LoS path is blocked by another vehicle, computation formulas (e.g., formulas for highway and urban driving scenarios in table 1400 of FIG. 14) for the probability of LoS (e.g., P(LoS)) may be utilized, where a distance (d) is between a HV (e.g., vehicle) and an RV (e.g., V2X object), and the HV and RV should be located on the same road. In some cases, the HV and RV may be on different roads (e.g., if the HV and RV are still located close to one another). An embedded map and a sensor of the vehicle can each provide the location of the non-V2X obstacle. The highway and urban driving scenarios may be determined based on the type of road (e.g., which may be determined by using an embedded map), a perceived speed limit for the road, and an average self-speed for driving within a certain time period.

In one or more aspects, the distance (d) can be the difference between the position of the equipped (e.g., V2X capable) network device (e.g., vehicle) and a position of the V2X object (e.g., a position within a vehicle-based message, such as a BSM), or can be determined by the received signal strength indicator (RSSI) of the vehicle-based message (e.g., BSM). In some aspects, the same road determination (e.g., whether the V2X object is located on the same road as the vehicle) can be made using an embedded map along with a position of the V2X object (e.g., a position within a vehicle-based message, such as a BSM). In one or more aspects, the context determination (e.g., whether it is a highway or urban scenario), can be made using road infrastructure (e.g., traffic sign) sensors, an embedded map, and/or an average self-speed (e.g., of the vehicle) within a time period. In some aspects, the state determination (e.g., whether the V2X object is located in NLoS or LoS of the sensors of the vehicle) can be made using a single threshold approach, such as if the probability of the LoS (P(LoS)) is greater than a probability threshold, then the V2X object is determined to be located within the LoS of the vehicle.

Figure 15:
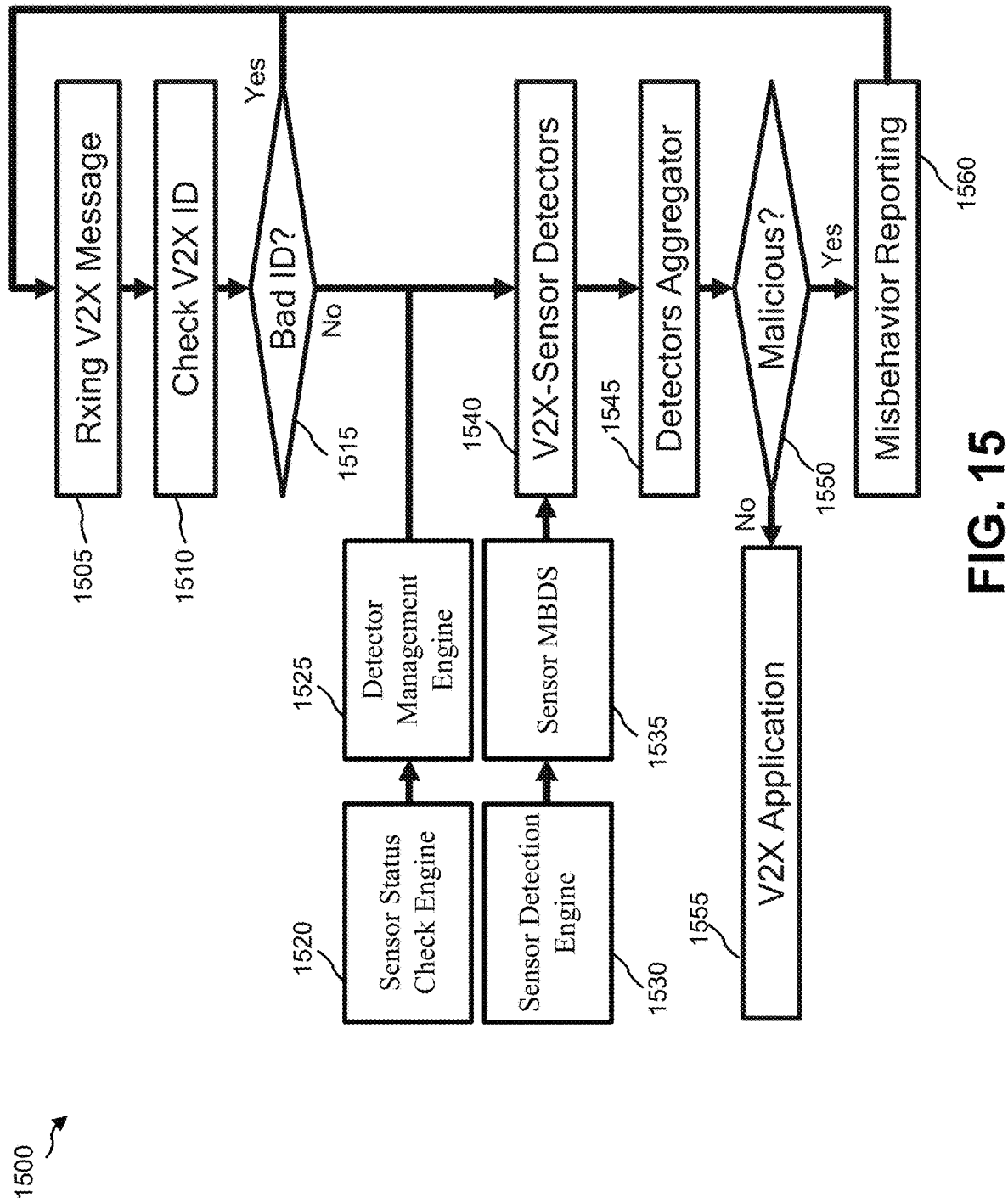
FIG. 15 is a diagram illustrating an example of operations of a detector for detecting simulated (fake) free space, where the detector may be employed for the V2X-sensor detectors of FIG. 12, in accordance with some aspects of the present disclosure.

FIG. 15 is a diagram 1500 illustrating an example of operations of a detector for detecting simulated (fake) free space, where the detector may be employed for the V2X-sensor detectors 1230 of FIG. 12. As shown in the diagram 1500 of FIG. 15, the detector can collect a V2X message, such as a CPM at block 1505. After the detector collects a V2X message (e.g., a CPM), the detector can check an identification (ID) of the V2X message at block 1510. After the detector checks the V2X ID, the detector can determine whether or not the ID of the V2X message is a bad (e.g., not valid) ID at block 1515. If the detector determine determines that the V2X ID is bad (a yes decision at block 1515), the detector may report the misbehavior at block 1560 (e.g., report that the V2X message has an invalid ID). If the detector determine determines that the V2X ID is valid or not bad (a no decision at block 1515), the operations can proceed to operation 1540, described below.

A sensor status check engine 1520 may include similar operations as the sensor status check engine 1210 of FIG. 12. For instance, the sensor status check engine 1520 can update and/or check (e.g., periodically update and/or check) the sensor status of one or more sensors to generate a configuration file, which is sent to the detector management engine 1525. The detector management engine 1525 can receive the configuration file, and can operate similar to the detector management engine 1215 of FIG. 12 to generate detectors parameters, which are sent to the V2X-sensor detectors 1540.

The sensor detection engine 1530 can operate similar to the fusion/sensor detection engine 1220 to collect all of the sensor data from at least one sensor (e.g., from a plurality of sensors) that is obtained for a particular scene. The sensor detection engine 1530 can send this collected sensor data to the sensor MBDS 1535. The sensor MBDS 1535 can receive the collected sensor data and operate similar to the fusion sensor/sensor MBDS 1225 to detect and remove (filters out) simulated (fake) sensor objects contained within the sensor data. The sensor MBDS 1535 can send the filtered sensor data to the V2X-sensor detectors 1540.

If the detector determines that the V2X ID is valid or not bad at block 1515, the V2X-sensors detector 1540 can receive the detector parameters from the detector management engine 1525 and the filtered out sensor data from the sensor MBDS 1535. The V2X-sensors detector 1540 can analyze (compare) these inputs to determine if there is malicious behavior (e.g., a sensor object is actually located in "free space" indicated in the CPM). In some cases, the V2X-sensor detectors 1540 can send the detector results to a detectors aggregator 1545, which may be similar to the detectors aggregator 1240. The detectors aggregator 1545 can aggregate (combine) the received results from the V2X-sensor detectors 1540. In such cases, depending upon the aggregated results, it can be determined (e.g., by at least one processor) whether or not malicious behavior has been detected at block 1550. If the V2X-sensors detector 1540 (or the detectors aggregator 1545) determines that there is no malicious behavior (e.g., a sensor object is not located in "free space" indicated in the CPM and, as such, the indicated "free space" is actually free space), then the V2X application can proceed at block 1555. However, if the V2X-sensors detector 1540 (or the detectors aggregator 1545) determines that there is malicious behavior (e.g., a sensor object is actually located in "free space" indicated in the CPM and, as such, the indicated "free space" is not actually free space), the detector may report the misbehavior at block 1560 (e.g., report that a sensor object is actually located within the "free space" indicated in the CPM).

Figure 16A:
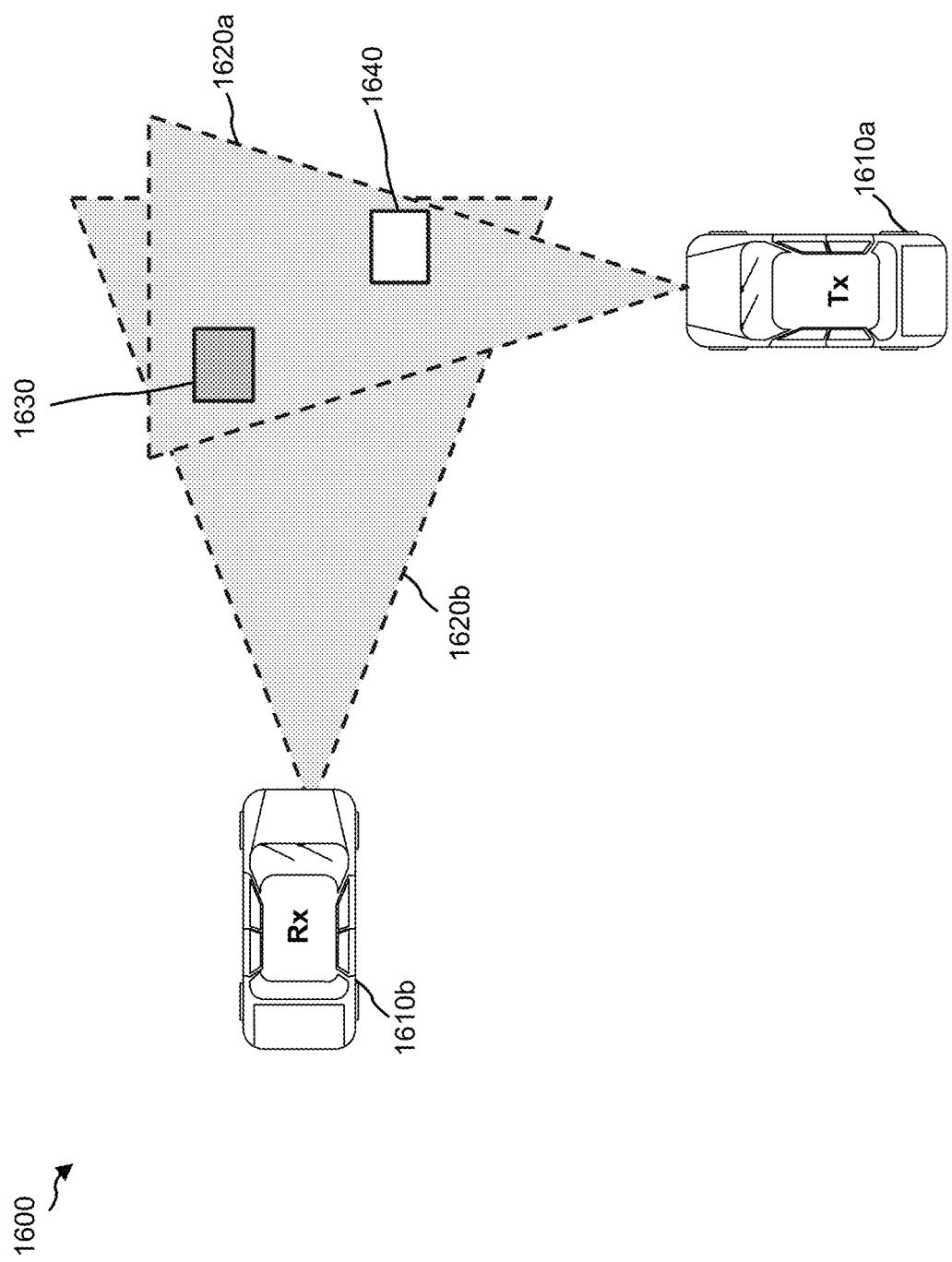
FIG. 16A is a diagram illustrating an example of a ground truth view, in accordance with some aspects of the present disclosure.

FIGS. 16A, 16B, 16C, and 16D each show examples of different views 1600, 1601, 1602, 1603. In particular, FIG. 16A is a diagram illustrating an example of a ground truth view 1600. In FIG. 16A, a transmitting equipped (e.g., V2X capable) network device 1610a (e.g., a vehicle) and a receiving equipped (e.g., V2X capable) network device 1610b (e.g., a vehicle) are shown. The transmitting equipped (e.g., V2X capable) network device 1610a (e.g., a vehicle) may send a CPM to the receiving equipped (e.g., V2X capable) network device 1610b (e.g., a vehicle). FIG. 16A depicts a ground truth view related to this use case.

A sensor FoV 1620a for the transmitting equipped (e.g., V2X capable) network device 1610a (e.g., a vehicle) and a sensor FoV 1620b for the receiving equipped (e.g., V2X capable) network device 1610b (e.g., a vehicle) are shown in FIG. 16A. A V2X object 1640 is in both of the FoVs 1620a, 1620b. A non-V2X object 1630 is located in the LoS of both the transmitting equipped (e.g., V2X capable) network device 1610a (e.g., a vehicle) and the receiving equipped (e.g., V2X capable) network device 1610b (e.g., a vehicle). As such, the ground truth view 1600 may include both V2X objects (e.g., V2X object 164) and non-V2X objects (e.g., non-V2X object 1630).

Figure 16B:
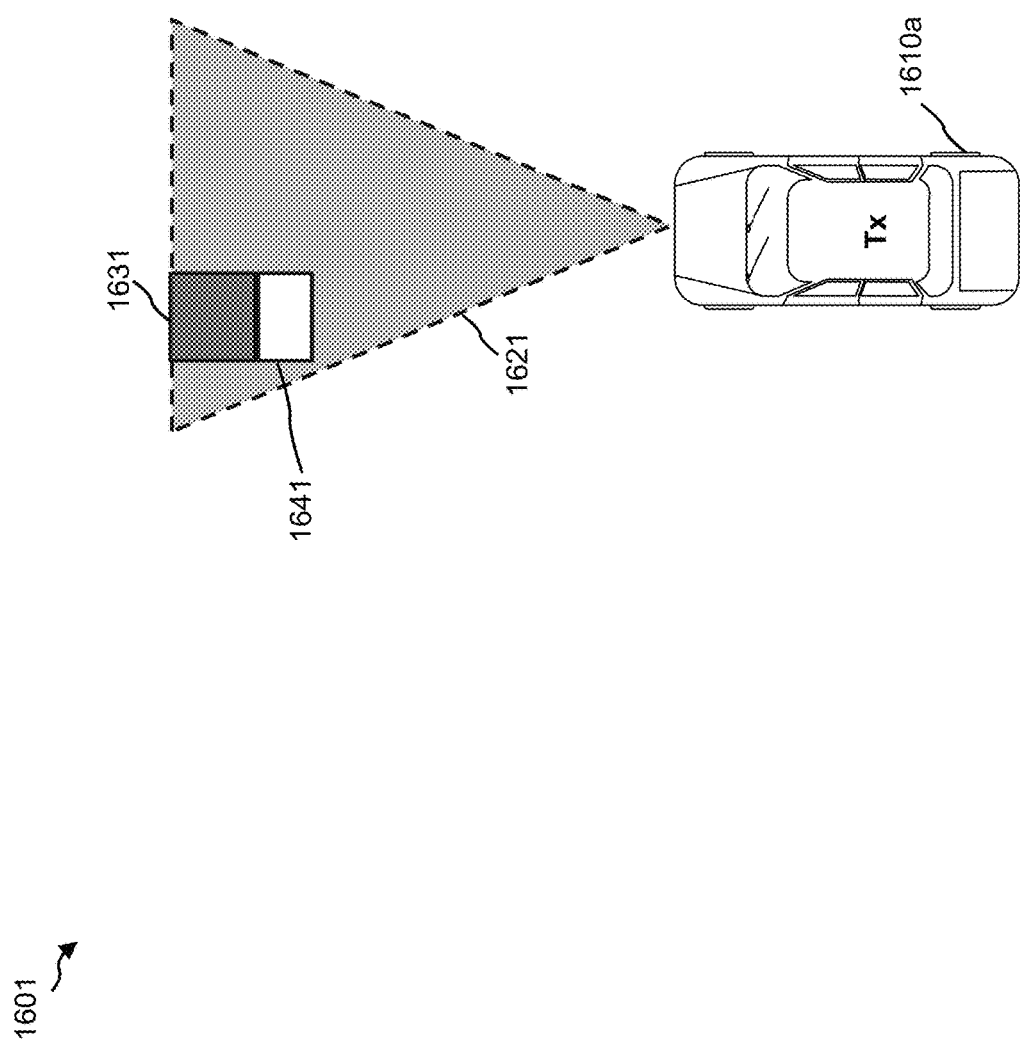
FIG. 16B is a diagram illustrating an example of a Collective Perception Message (CPM) view, in accordance with some aspects of the present disclosure.

FIG. 16B is a diagram illustrating an example of a Collective Perception Message (CPM) view 1601. In FIG. 16B, the transmitting equipped (e.g., V2X capable) network device 1610a (e.g., a vehicle) is shown. FIG. 16B shows the CPM view of the CPM sent (transmitted) by the transmitting equipped (e.g., V2X capable) network device 1610a (e.g., a vehicle). A CPM view does not contain any objects perceived by sensors that are V2X sensors and, as such, a CPM view should not contain any V2X objects.

"Free space" as indicated in the CPM (e.g., free space in CPM 1621) is shown. A CPM object (Tx) 1641 as perceived by a sensor of the transmitting equipped (e.g., V2X capable) network device 1610a (e.g., a vehicle) is also shown. A shadowed space 1631 depicts an area that is not visible to the sensor of the transmitting equipped (e.g., V2X capable) network device 1610a (e.g., a vehicle) because the CPM object (Tx) 1641 is blocking (obstructing) the view of the transmitting equipped (e.g., V2X capable) network device 1610a (e.g., a vehicle).

Figure 16C:
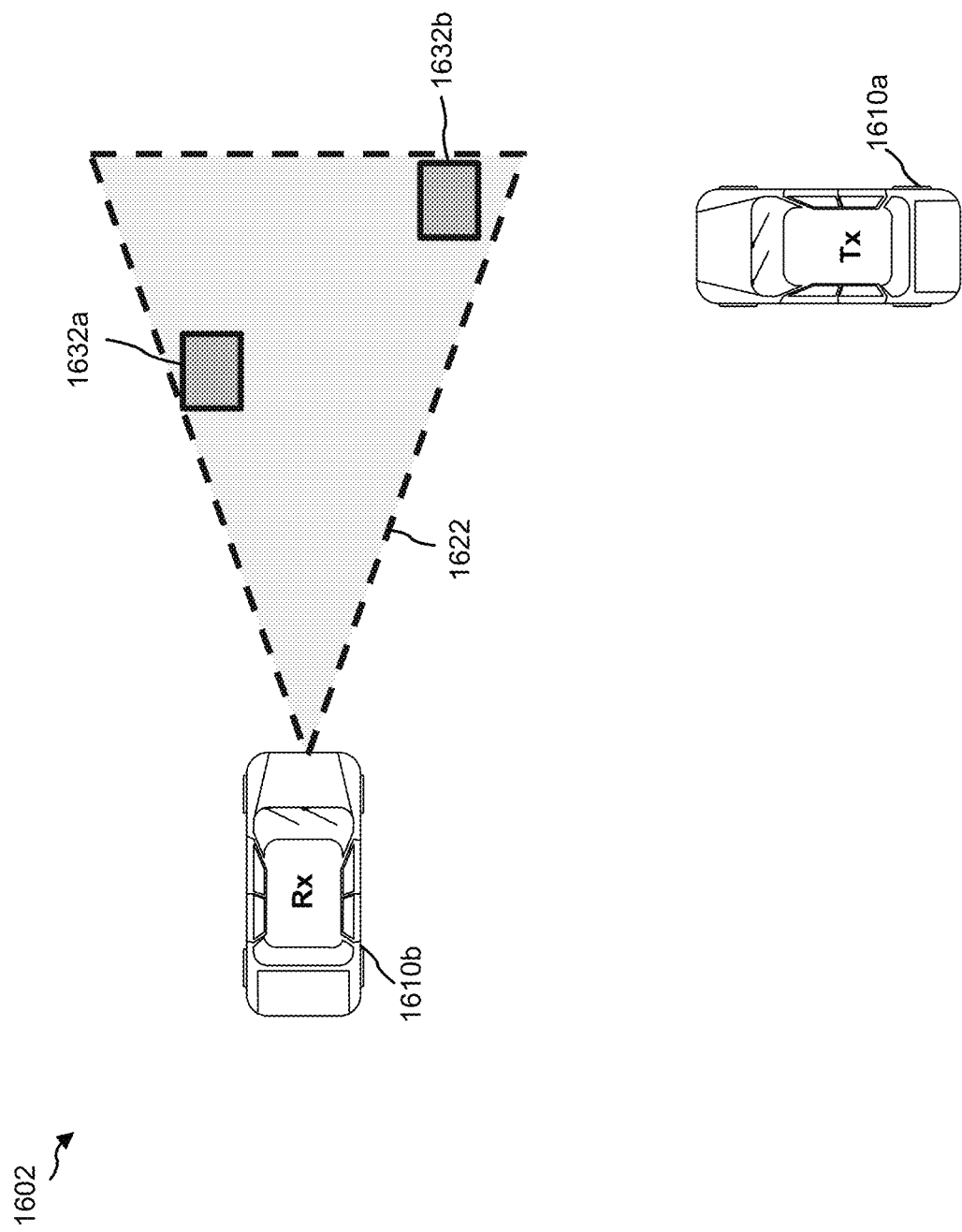
FIG. 16C is a diagram illustrating an example of a receiver (Rx) sensor view, in accordance with some aspects of the present disclosure.

FIG. 16C is a diagram illustrating an example of a receiver (Rx) sensor view 1602. In FIG. 16C, the transmitting equipped (e.g., V2X capable) network device 1610a (e.g., a vehicle) and the receiving equipped (e.g., V2X capable) network device 1610b (e.g., a vehicle) are shown. A sensor FoV 1622 of the receiving equipped (e.g., V2X capable) network device 1610b (e.g., a vehicle) is shown to include sensor objects (Rx) 1632a, 1632b that are perceived by a sensor of the receiving equipped (e.g., V2X capable) network device 1610b (e.g., a vehicle). As Rx sensor view may contain both non-V2X objects and V2X objects.

Figure 16D:
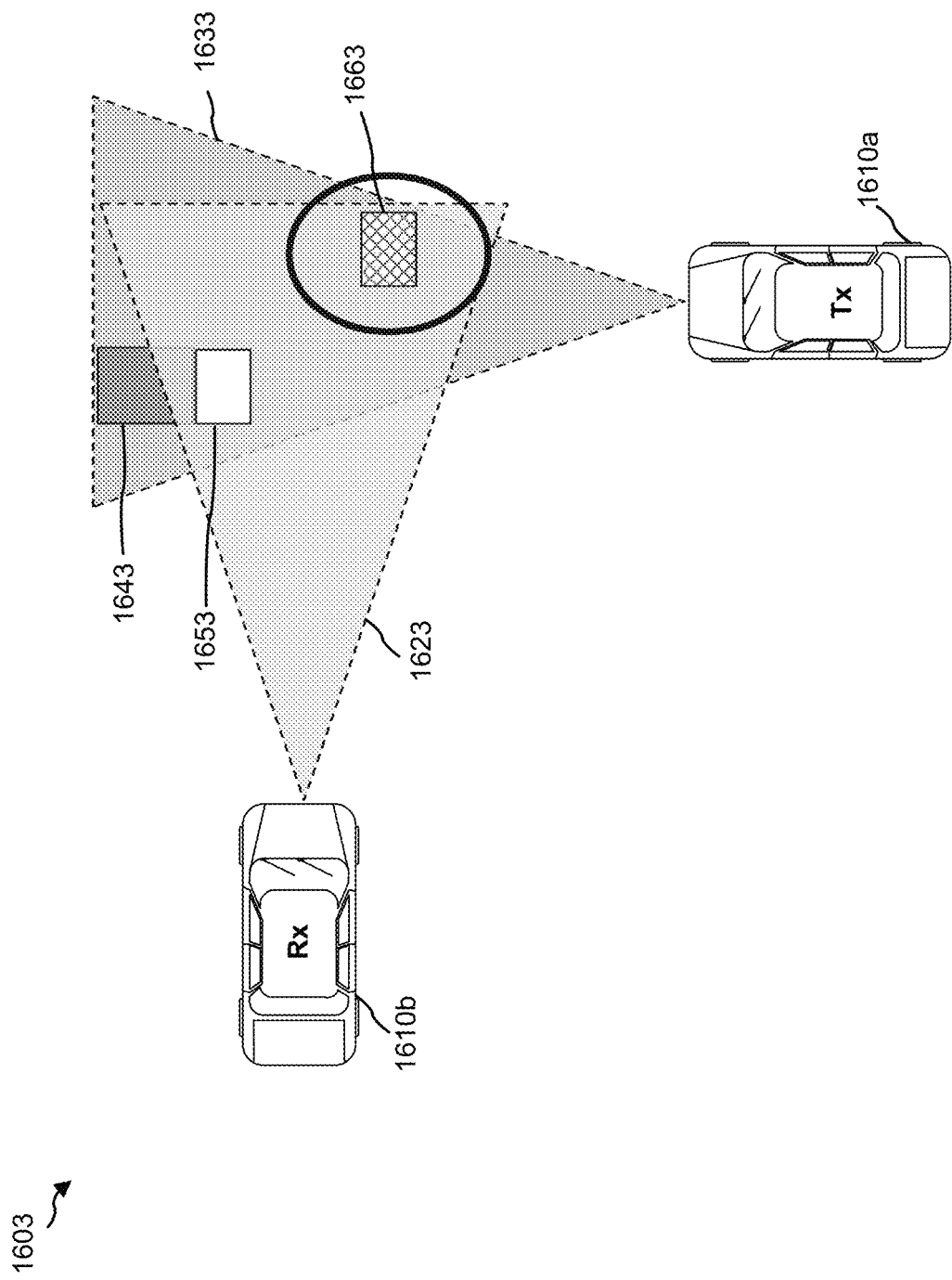
FIG. 16D is a diagram illustrating an example of an overall Rx view, in accordance with some aspects of the present disclosure.

FIG. 16D is a diagram illustrating an example of an overall Rx view 1603. In FIG. 16D, the transmitting equipped (e.g., V2X capable) network device 1610a (e.g., a vehicle) and the receiving equipped (e.g., V2X capable) network device 1610b (e.g., a vehicle) are shown. In particular, FIG. D shows one example of the detector checking for an inconsistence in the free space. For example, the receiving equipped (e.g., V2X capable) network device 1610b (e.g., a vehicle) may check for an inconsistency in the CPM sent (transmitted) by the transmitting equipped (e.g., V2X capable) network device 1610a (e.g., a vehicle).

A free space in CPM 1633 (e.g., an area indicated as free space in the CPM) is shown to include a shadowed space 1643. The sensor of the receiving equipped (e.g., V2X capable) network device 1610b (e.g., a vehicle) may detect (e.g., within the sensor FoV 1623) two objects in the free space in CPM 1633. The FoV 1623 may include an object 1653 that may be both a CPM object (Tx) (e.g., an object indicated in the transmitted CPM) and a sensor object (Rx) (e.g., an object perceived by a sensor on the receiving vehicle 1610b). Since this object 1653 is both a CPM object (Tx) and a sensor object (Rx), the object 1653 has been verified.

The FoV 1623 may also include an object 1663 that may be a sensor object (Rx) (e.g., an object perceived by a sensor on the receiving vehicle 1610*b*) and a V2X object (e.g., an object perceived by V2X sensors). A V2X object should not be contained within a CPM. Since the CPM has defined the area of the object 1663 to be "free space", but the object 1663 has been detected by a sensor on the receiving vehicle 1610*b*, there is an inconsistency for object 1663. Since there is an inconsistency for object 1663, an alert regarding simulated (fake) "free space" in the area of object 1663 can be generated.

Figure 17:
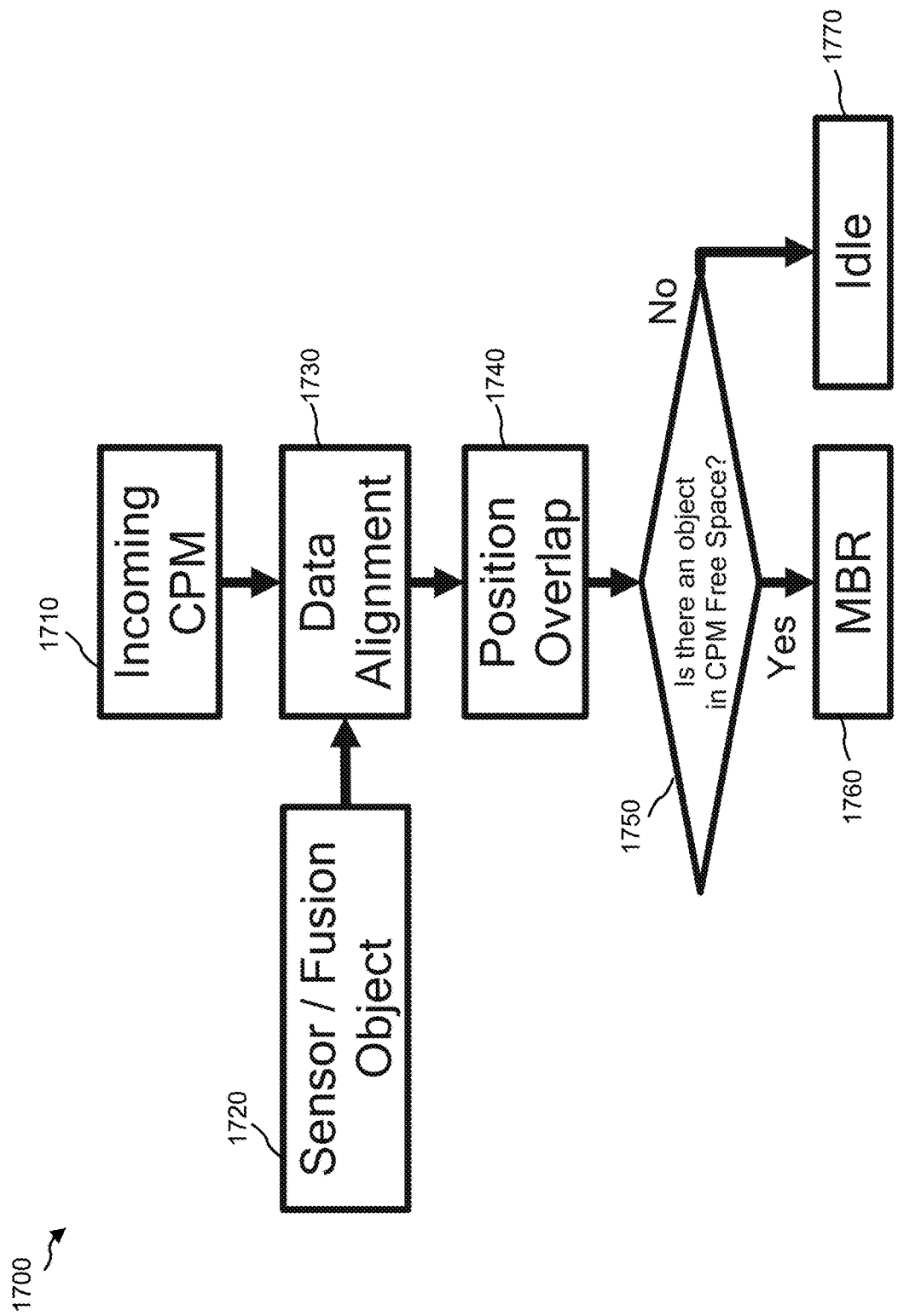
FIG. 17 is a flow chart illustrating example processes that may be performed by a detector for detecting simulated (fake) free space, where the detector may be employed for the V2X-sensor detectors of FIG. 12, in accordance with some aspects of the present disclosure.

FIG. 17 is a flow chart illustrating example processes 1700 that may be performed by a detector for detecting simulated (fake) free space, where the detector may be employed for the V2X-sensor detectors 1230 of FIG. 12. In the processes 1700 of FIG. 17, the detector may receive an incoming CPM at block 1710. After the detector receives the CPM, at block 1720, the detector may perform data alignment at block 1730 to align (e.g., in both time and space) the "free space" data in the CPM and object data from a sensor/fusion object (e.g., object data obtained from sensors).

After the detector has aligned the "free space" data in the CPM and the object data from a sensor/fusion object, the detector may determine whether there is any position overlap at block 1740 (e.g., any overlap in position) of the sensor object (e.g., which may have its an area represented in the form of a square or rectangle shape, based on the length and width of the object) in the CPM "free space" at block 1750. If the detector does not determine that there is any position overlap of the sensor object in the CPM "free space", the detector can remain idle at block 1770, and may output an output in the form of a Boolean indicator (e.g., an output of zero to indicate a "no"). However, if the detector determines that there is some position overlap of the sensor object in the CPM "free space", the detector may generate a misbehavior report (MBR) at block 1760, and output an output in the form of a Boolean indicator (e.g., an output of a one to indicate a "yes"). The detector may send (transmit) the misbehavior report to a misbehavior authority. The misbehavior report may indicate the triggered detector (e.g., the specific detector that generated the misbehavior report) and contain evidence (e.g., the CPM and sensor data) for the misbehavior.

Figure 18:
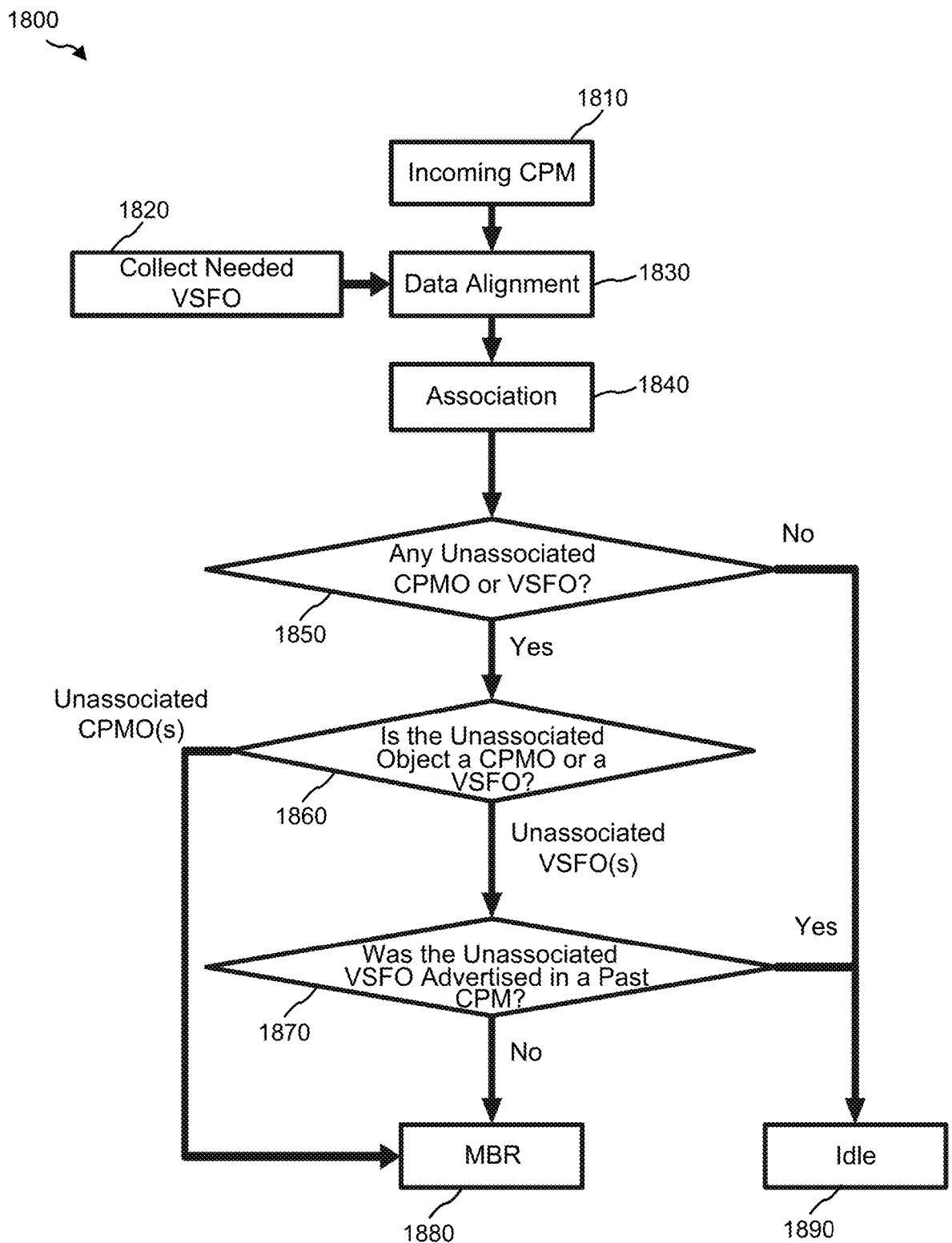
FIG. 18 is a flow chart illustrating an example of a process for operation of a detector for detecting an inconsistent number of CPM objects, where the detector may be employed for the V2X-sensor detectors of FIG. 12, in accordance with some aspects of the present disclosure.

FIG. 18 is a flow chart illustrating an example of a process 1800 for operation of a detector for detecting an inconsistent number of CPM objects, where the detector may be employed for the V2X-sensor detectors 1230 of FIG. 12. In the process 1800 of FIG. 18, the detector may receive an incoming CPM at block 1810, which may include CPM object (CPMO) data. The detector may collect needed V2X-sensor fusion object (VSFO) data at block 1820. In one or more aspects, the VSFO data may include a position, speed, and heading for V2X-sensor fusion objects (e.g., objects perceived by V2X sensors).

After the detector receives the CPM and the VSFO, the detector may perform data alignment at block 1830 to align (e.g., in both time and space) the CPMO data and the VSFO data. After the detector aligns the CPMO data and the VSFO data, the detector may perform association at block 1840 to associate objects in the CPMO data with objects in the VSFO data. After the detector associates objects in the CPMO data with objects in the VSFO data, the detector can determine whether there are any unassociated objects in the CPMO data or in the VSFO data at block 1850.

If the detector determines that there are not any unassociated objects in the CPMO data or in the VSFO data, the detector may simply remain idle 1890. However, if the detector determines that there is at least one unassociated object in the CPMO data or in the VSFO data, the detector may determine whether the unassociated object is a CMPO or a VSFO at block 1860. If the detector determines that the unassociated object is a CMPO, the detector may generate a misbehavior report at block 1880. However, if the detector determines that the unassociated object is a VSFO, the detector may determine whether the unassociated VSFO has been advertised in a past CPM at block 1870. If the detector determines that the VSFO object has been advertised in a past (previous) CPM, the detector will remain idle at block 1890. However, if the detector determines that the VSFO object has been advertised in a past (previous) CPM, the detector may generate a misbehavior report at block 1880. In one or more aspects, the generation and transmission of a misbehavior report at block 1880 may be performed as specified in ETSI TS 103 759.

FIGS. 19A, 19B, 19C, 19D, and 19E are diagrams that together illustrate an example of processes 1900, 1901, 1902, 1903, 1904 that may be performed by the detector of FIG. 18 for detecting simulated (fake) CPM objects. In FIGS. 19A, 19B, 19C, 19D, and 19E, a transmitting equipped (e.g., V2X capable) network device 1910*a* (e.g., a vehicle) and a receiving equipped (e.g., V2X capable) network device 1910*b* (e.g., a vehicle) are shown. A free space in CPM 1920 for the transmitting equipped (e.g., V2X capable) network device 1910*a* (e.g., a vehicle), and a sensor FoV 1930 for the receiving equipped (e.g., V2X capable) network device 1910*b* (e.g., a vehicle) are shown in FIGS. 19A, 19B, 19C, 19D, and 19E.

Figure 19A:
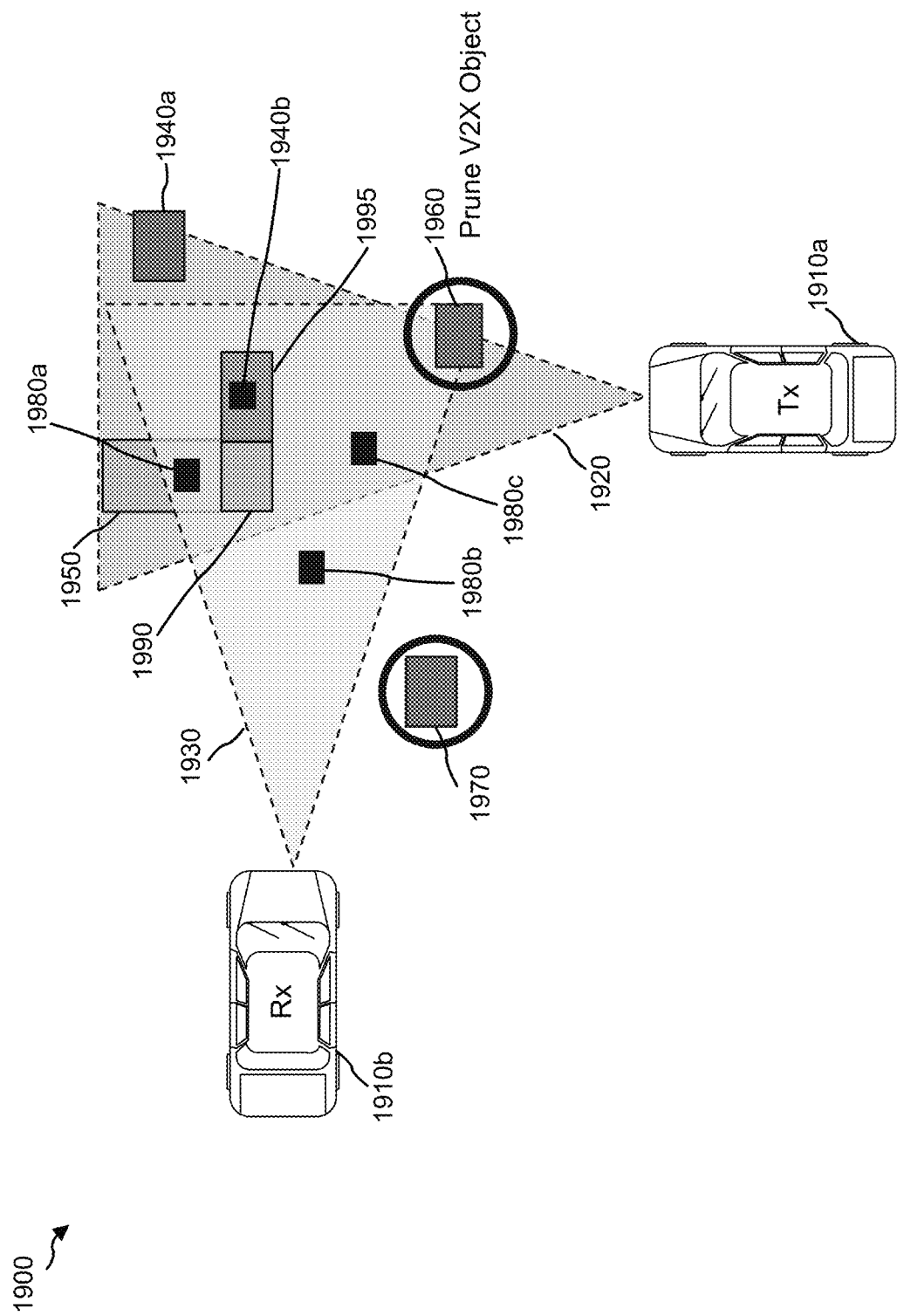
FIGS. 19A, 19B, 19C, 19D, and 19E are diagrams that together illustrate an example of processes that may be performed by the detector of FIG. 18 for detecting simulated (fake) CPM objects, in accordance with some aspects of the present disclosure.

FIG. 19A illustrates an example of the process of collecting needed VSFOs (e.g., block 1820 of FIG. 18). In FIG. 19A, CPM objects (Tx) 1940*a*, 1940*b* (e.g., objects contained within a CPM sent by the transmitting vehicle 1910*a*), and VSFOs (Rx) 1980*a*, 1980*b*, 1980*c* (e.g., VSFOs detected by the receiving vehicle 1910*b*) are shown. In FIG. 19A, a shadowed space (CPM) 1950 (e.g., a space not detectable the transmitting vehicle 1910*a*) and a shadowed space (sensor) 1995 (e.g., a space not detectable by the receiving vehicle 1910*b*) are shown.

Also shown in an object 1990 that can be associated with both a CPM object (Tx) (e.g., an object contained within a CPM sent by the transmitting vehicle 1910*a*) and a VSFO object (Rx) (e.g., a VSFO detected by the receiving vehicle 1910*b*). Since this object 1990 can be associated with both a CPM object (Tx) and a VSFO object (Rx), the object 1990 can be verified.

In FIG. 19A, a V2X object 1970 is shown, and an object 1960 that can be associated with both a V2X object and a VSFO object (Rx). Since a CPM only contains objects that are non-V2X objects (e.g., a CPM cannot contain a V2X object), any objects in FIG. 19A that are V2X objects should be removed (pruned). As such, objects 1970 and 1960 should be removed from FIG. 19A.

Figure 19B:
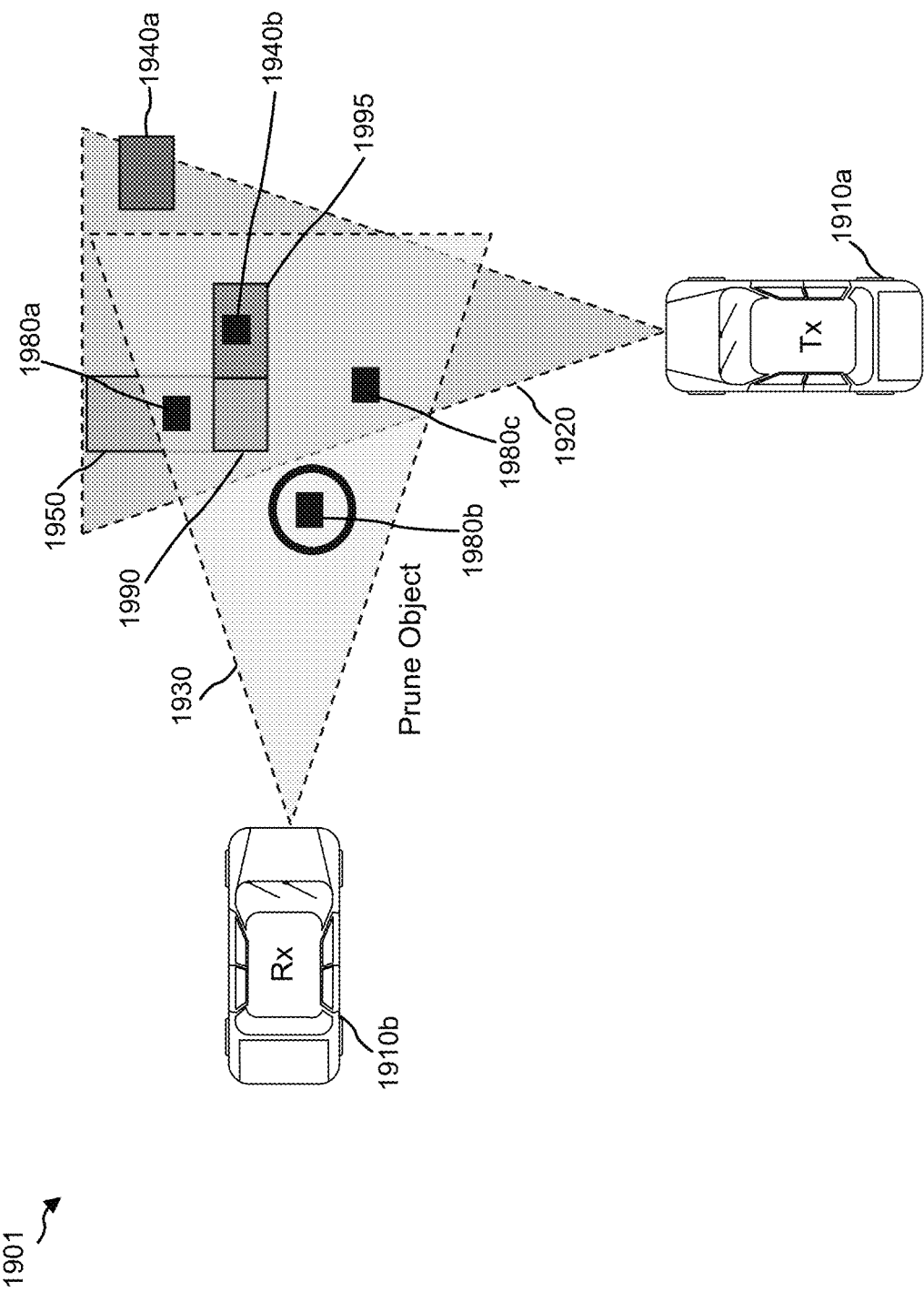
Figure 19C:
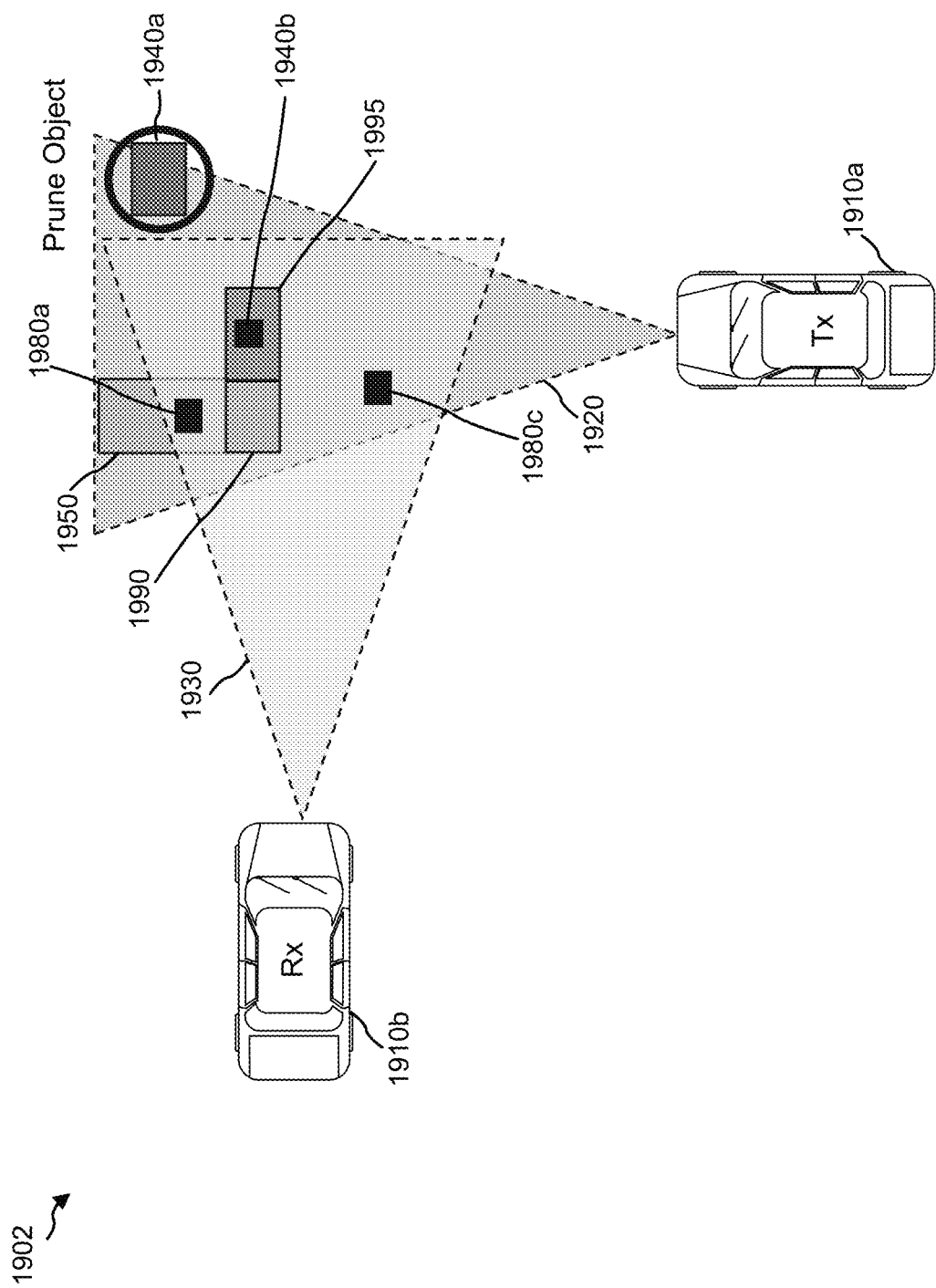
Figure 19D:
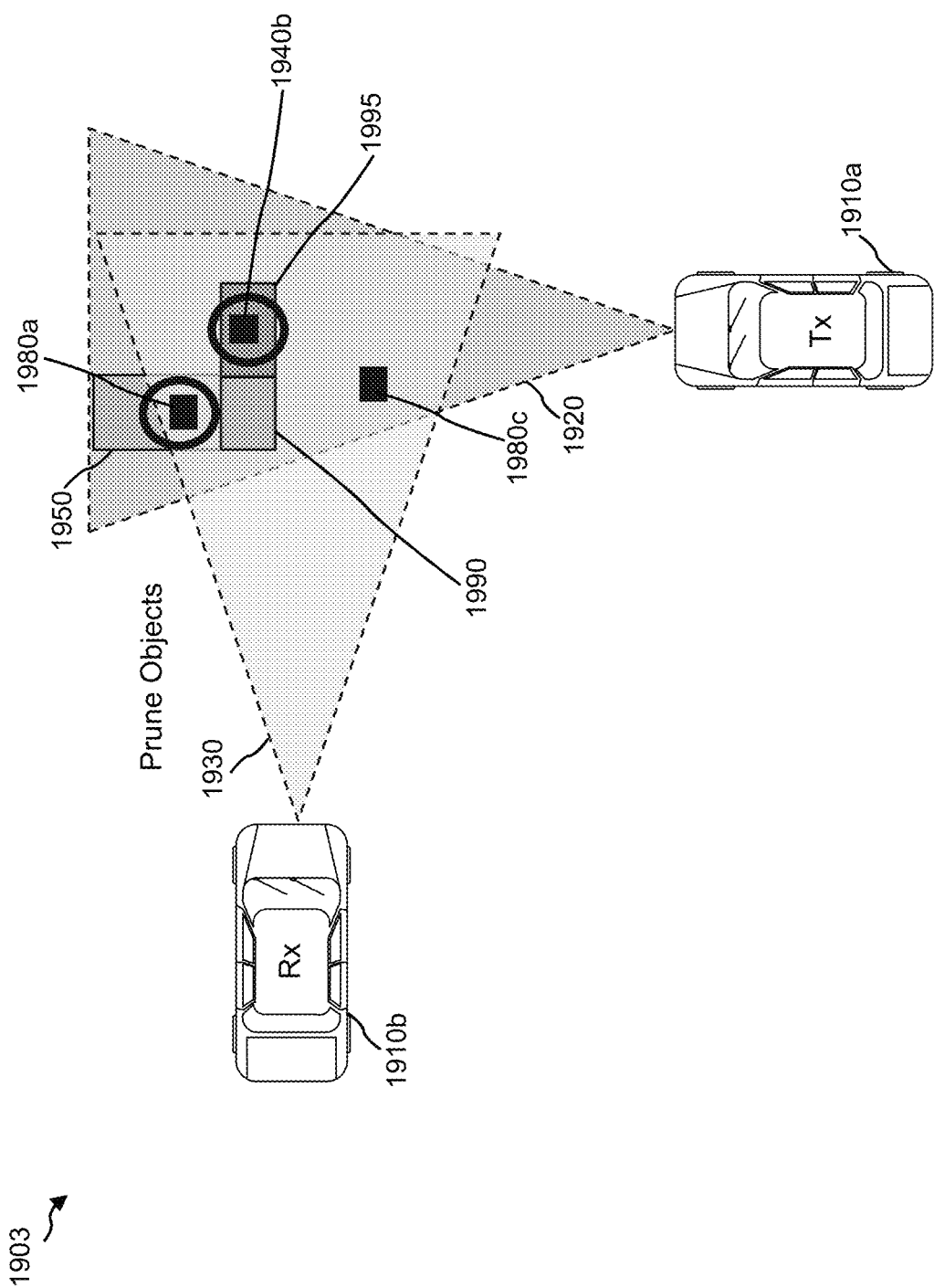

FIGS. 19B, 19C, and 19D illustrate an example of the process of association (e.g., block 1840 of FIG. 18). FIG. 19B is similar to FIG. 19A, except that objects 1970 and 1960 have been removed. In FIG. 19B, object 1980*b* is shown to not be within the field of view of the free space in CPM 1920. Since object 1980*b* is not be within the field of view of the free space in CPM 1920, object 1980*b* should be removed (pruned) such that only objects that can be sensed by the transmitting equipped (e.g., V2X capable) network device 1910*a* (e.g., a vehicle) remain.

FIG. 19C is similar to FIG. 19B, except that object 1980*b* has been removed. In FIG. 19C, object 1940*a* is shown to not be within the FoV 1930 of the receiving equipped (e.g., V2X capable) network device 1910*b* (e.g., a vehicle). Since object 1940*a* is not be within the FoV 1930, object 1940*a* should be removed (pruned) such that only objects that can be sensed by the receiving equipped (e.g., V2X capable) network device 1910*b* (e.g., a vehicle) remain.

FIG. 19D is similar to FIG. 19C, except that object 1940*a* has been removed (pruned). In FIG. 19D, object 1940*b* is occluded from the view of the receiving equipped (e.g., V2X capable) network device 1910*b* (e.g., a vehicle) because object 1990 is located in front of object 1940*b*. Object 1980*a* is occluded from the view of the transmitting equipped (e.g., V2X capable) network device 1910*a* (e.g., a vehicle) because object 1990 is located in front of object 1980*a*. Since objects 1940*b* and 1980*a* are occluded objects, objects 1940*b* and 1980*a* should be removed (pruned).

Figure 19E:
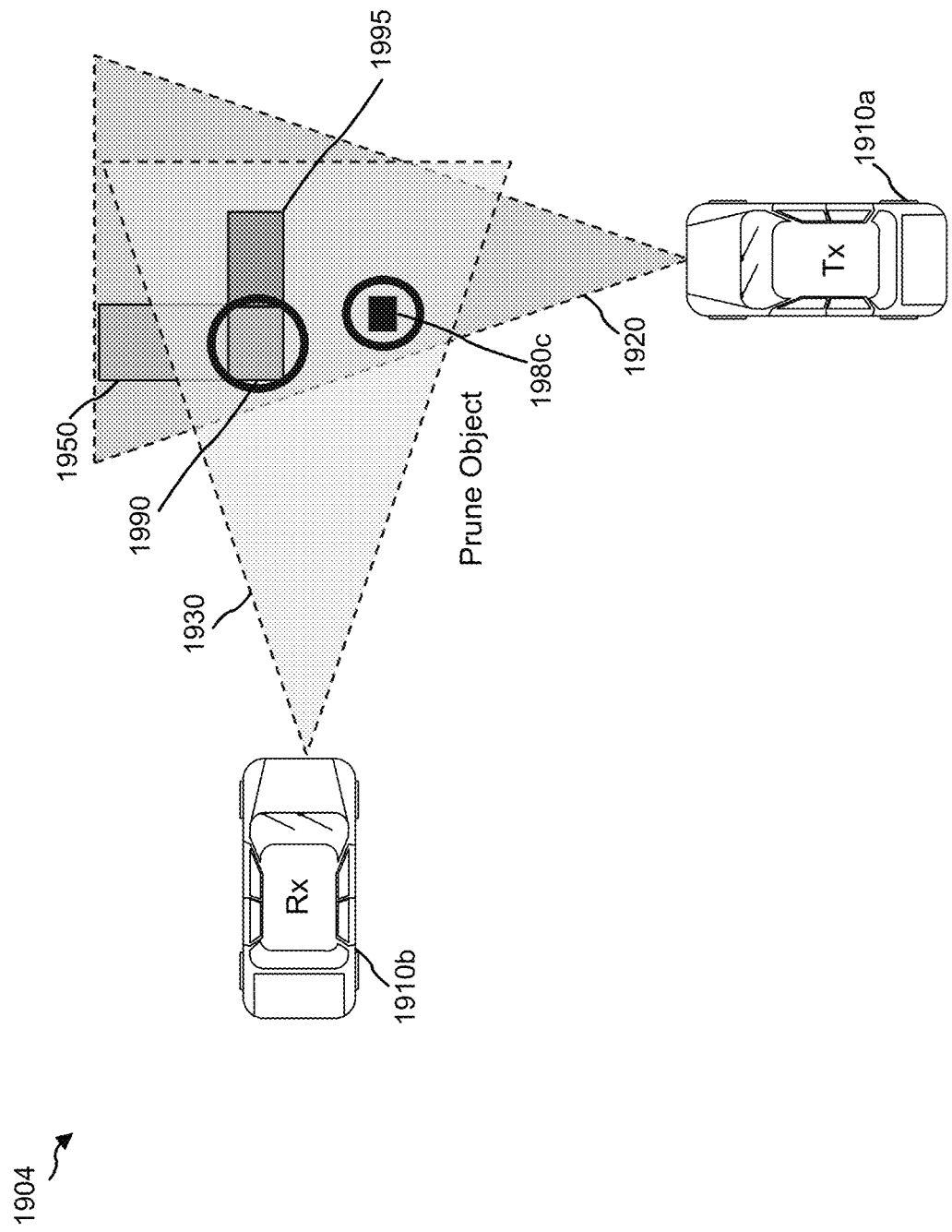

FIG. 19E illustrates an example of the process of association (e.g., block 1840 of FIG. 18) and the process of generating a misbehavior report (e.g., block 1880 of FIG. 18). FIG. 19E is similar to FIG. 19D, except that objects 1940*b* and 1980*a* have been removed. As previously mentioned, the object 1990 can be associated with both a CPM object (Tx) (e.g., an object contained within a CPM sent by the transmitting vehicle 1910*a*) and a VSFO object (Rx) (e.g., a VSFO detected by the receiving vehicle 1910*b*). As such, since this object 1990 can be associated with both a CPM object (Tx) and a VSFO object (Rx), the object 1900 can be verified.

However, the object 1980*c* is a sensor object (Rx) that does not also have a CPM object (Tx) associated with it. Since object 1980*c* does not also have a CPM object (Tx) associated with it, a misbehavior report can be generated to alert of this object 1980*c*. As such, misbehavior reports can be generated for objects that are sensor objects (Rx) that do not also have an associated CPM object (Tx). For these cases, a malicious transmitter may have removed a CPM object from the CPM.

In some cases, misbehavior reports may also be generated for CPM objects (Tx) that have not been associated (e.g., associated with sensor objects (Rx)). For these cases, a malicious transmitter may have added a simulated (fake) CPM object to the CPM.

Figure 20:
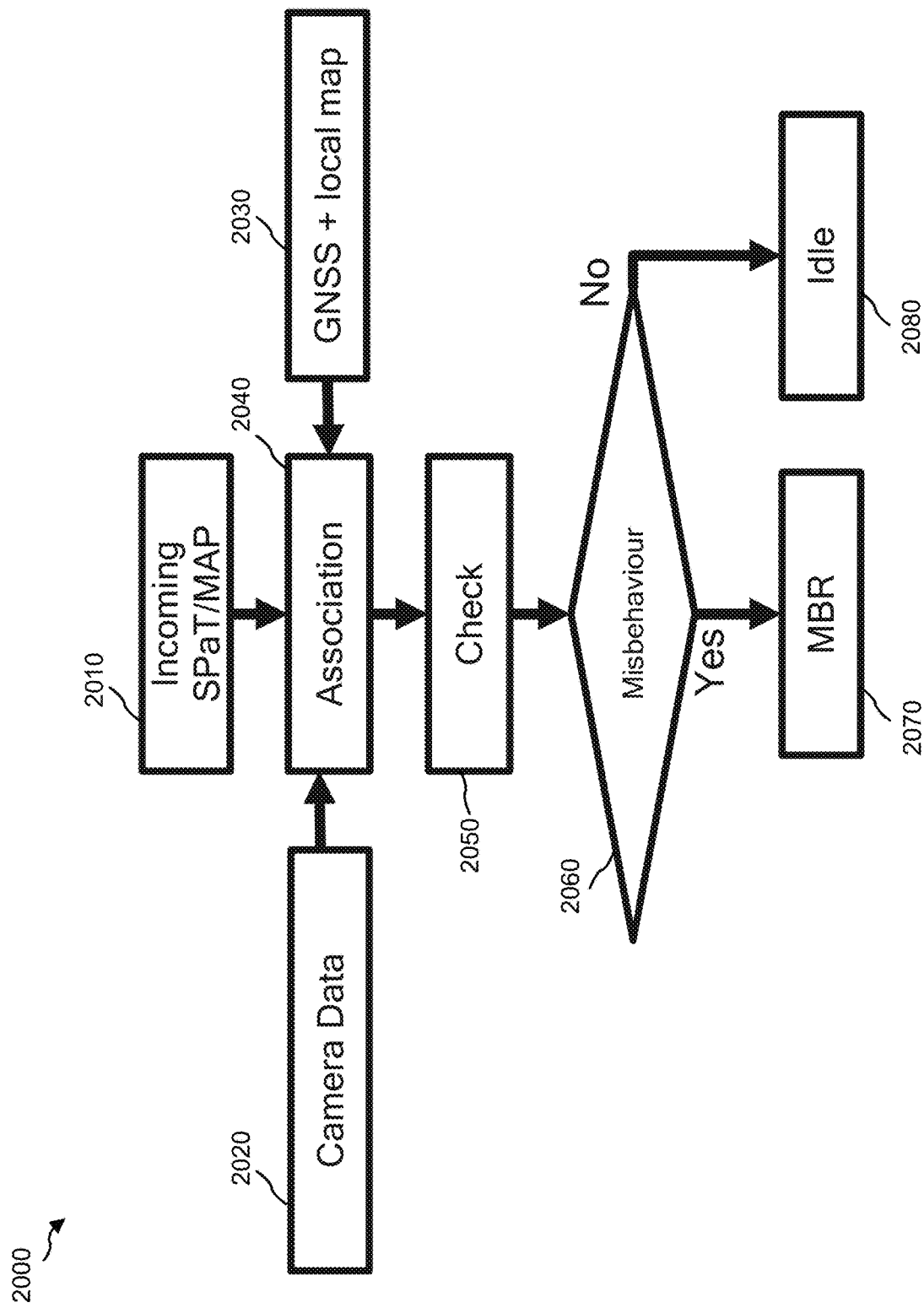
FIG. 20 is a flow chart illustrating an example of a process for operation of a detector for detecting a V2X-camera inconsistency, where the detector may be employed for the V2X-sensor detectors of FIG. 12, in accordance with some aspects of the present disclosure.

FIG. 20 is a flow chart illustrating an example of a process 2000 for operation of a detector for detecting a V2X-camera inconsistency, where the detector may be employed for the V2X-sensor detectors 1230 of FIG. 12. In the process 2000 of FIG. 20, the detector can receive an incoming SPaT and map data (SPaT/MAP) (2010). At block 2040, the detector can associate information contained within the SPaT/MAP with camera (sensor) data (2020) and map data (e.g., GNSS data and local map data) (2030). For example, the detector can associate a traffic light detected with a camera with corresponding lane information in the map data. In some examples, the detector can translate the lane ID, the coordinates of the traffic light ID, and/or the coordinates of the traffic light from the MAP or SPaT into local map coordinates.

After the detector has associated the information contained within the SPaT/MAP with the camera data and the map data, the detector can check (2050) whether the data (e.g., relating to a traffic light) advertised within the SPaT or MAP message matches the data (e.g., relating to the traffic light) detected by the camera. For example, the detector may check (verify) whether the number of lanes in the road (e.g., where a vehicle is located) advertised by the MAP message matches the number of lanes perceived by the camera and/or the number of lanes contained within the local map.

After the detector has checked to verify whether the data advertised within the SPaT or MAP message matches the data detected by the camera, the detector can determine whether a misbehavior has been detected (2060). If the detector does not determine that a misbehavior has been detected, the detector can remain idle (2080). However, if the detector does determine that a misbehavior has been detected, the detector can generate a misbehavior report (2070). In one or more examples, in the absence of a match), the detector can generate a misbehavior report. For instance, if the detector cannot associate information contained within the SPaT/MAP with the camera (and/or other sensor) data and map data (e.g., GNSS data and/or local map data), the detector may not generate a misbehavior report.

Figure 21:
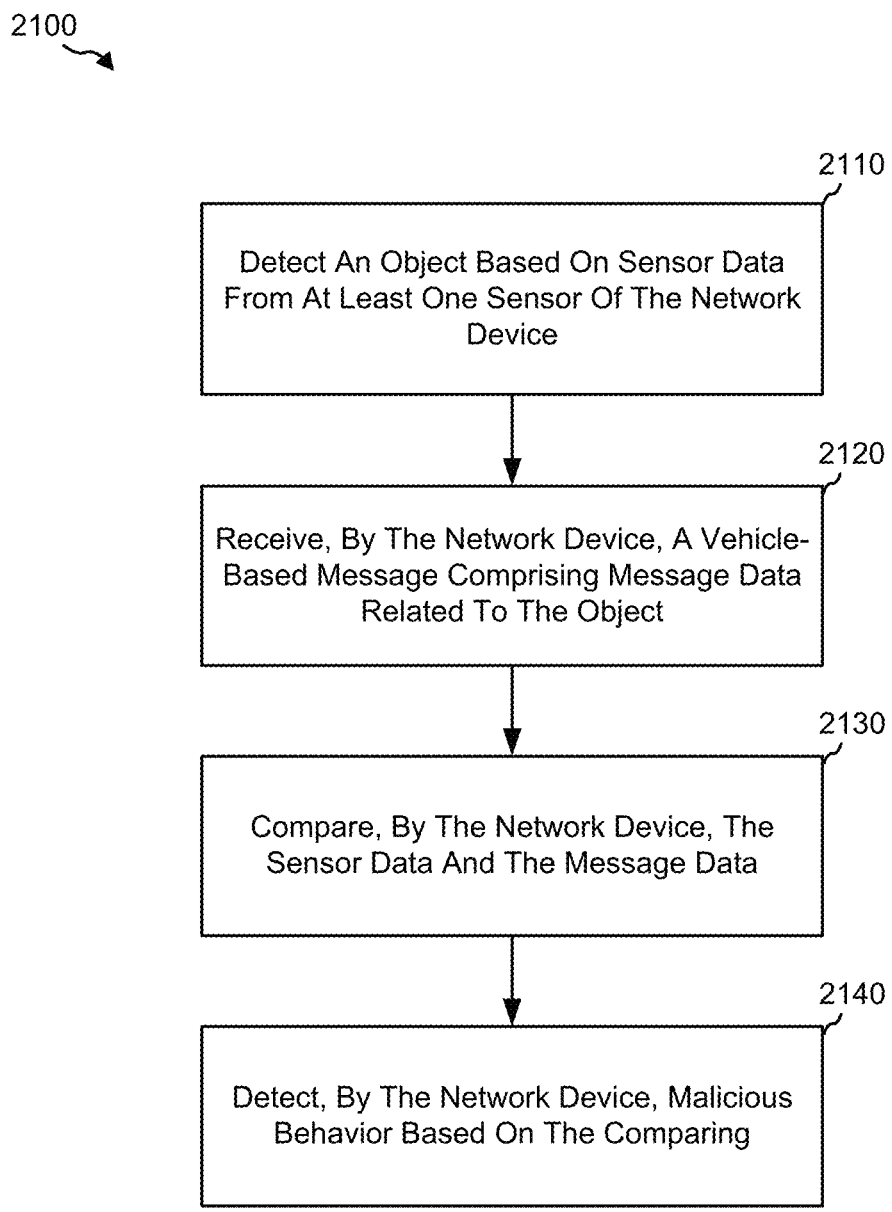
FIG. 21 is a flow chart illustrating an example of a process for wireless communications, according to some aspects of the present disclosure.

FIG. 21 is a flow chart illustrating an example of a process 2100 for wireless communications. The process 2100 can be performed by a network device or by a component or system of the network device (e.g., an onboard unit (OBU) of the network device, a chipset of the network device, or other component or system of the network device). For example, the network device may be a vehicle, a user equipment (UE), a roadside unit (RSU), traffic infrastructure, a drone (or unmanned aerial vehicle (UAE), or other network device. The network device is capable of transmitting, receiving, and processing vehicle-based communications, such as Vehicle-to-Everything (V2X) communications (e.g., V2X messages). The operations of the process 2100 may be implemented as software components that are executed and run on one or more processors (e.g., processor 2210 of FIG. 22 or other processor(s)) of the network device. Further, the transmission and reception of signals by the wireless communications device in the process 2100 may be enabled, for example, by one or more antennas and/or one or more transceivers (e.g., wireless transceiver(s)) of the network device.

At block 2110, the network device (or component, system, or apparatus thereof) may receive detect an object based on sensor data from at least one sensor of a network device. The at least one sensor may be a camera, a radar sensor, a Light Detection and Ranging (LIDAR) sensor, any combination thereof, and/or other sensor(s). In some cases, network device (or component, system, or apparatus thereof) may remove simulated objects from the sensor data (e.g., using the fusion/sensor MBDS 1225).

At block 2120, the network device (or component, system, or apparatus thereof) may receive a vehicle-based message comprising message data related to the object. The vehicle-based message may be a Basic Safety Message (BSM), a Cooperative Awareness Message (CAM), a Collective Perception Message (CPM), a Sensor Data Sharing Message (SDSM), a Decentralized Environmental Message (DENM), a Signal, Phase, and Time (SPaT) message, and/or other type of vehicle-based message.

At block 2130, the network device (or component, system, or apparatus thereof) may compare the sensor data and the message data (e.g., using the detector management engine 1215 and/or the V2X-sensor detectors 1230). In some cases, to compare the sensor data and the message data, the network device (or component, system, or apparatus thereof) may compare the sensor data and the message data to map data. As described herein, the map data may include satellite data, a local map, or both.

At block 2140, the network device (or component, system, or apparatus thereof) may detect malicious behavior based on the comparing (e.g., using the V2X-sensor detectors 1230). In some examples, as described herein, the malicious behavior may be based on inclusion of incorrect information contained within the vehicle-based message. For instance, a misbehaving vehicle or other network device may transmit the vehicle-based message with incorrect information (e.g., information indicating a traffic light is red instead of green). In some examples, as further described herein, the incorrect information may include at least one of a ghost object or simulated free space within the vehicle-based message. In some aspects, the network device (or component, system, or apparatus thereof) may generate a misbehavior report comprising information associated with the malicious behavior. The network device (or component, system, or apparatus thereof) may transmit the misbehavior report (or may output the misbehavior report for transmission) to a misbehavior authority (e.g., a server of the misbehavior authority).

In some cases, the network device (or component, system, or apparatus thereof) may disable or enable a first sensor of the at least one sensor (e.g., using the detector management engine 1215) based on a status of the first sensor, a capability of the first sensor, a characteristic of an environment in which the network device is located, any combination thereof, and/or other factors. The characteristic of the environment may include weather in the environment (e.g., fog, rain, etc.).

Additionally or alternatively, in some aspects, the network device (or component, system, or apparatus thereof) may assign or adjust a weight for the sensor data (e.g., using the detector management engine 1215) based on a capability of the at least one sensor. Additionally or alternatively, in some aspects, the network device (or component, system, or apparatus thereof) may adjust a detection range of the at least one sensor (e.g., using the detector management engine 1215) based on the capability of the at least one sensor. The capability of the at least one sensor may be related to an operability of the at least one sensor during weather conditions experienced by the at least one sensor in an environment in which the network device is located.

Figure 22:
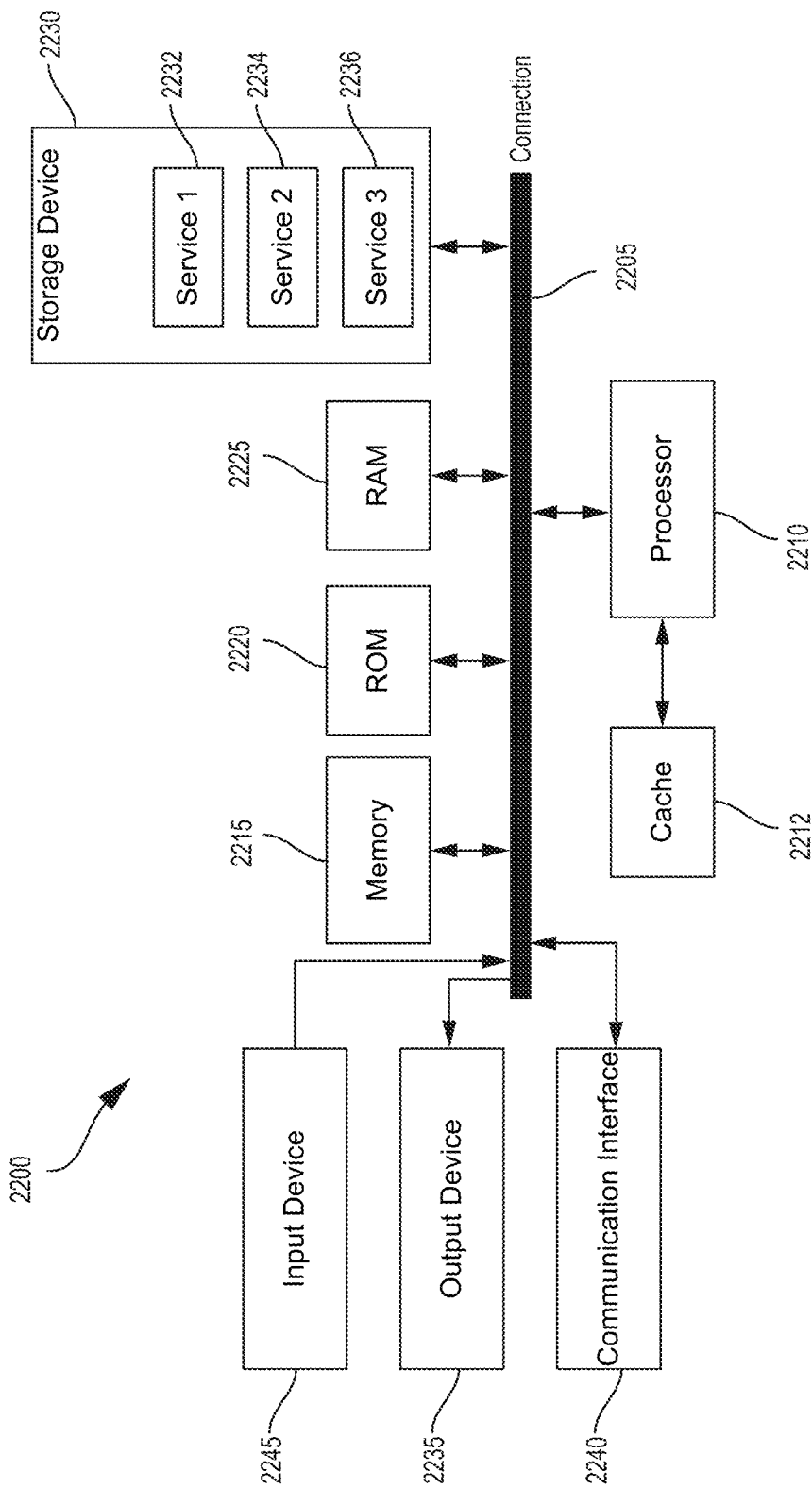
FIG. 22 illustrates an example computing system, according to aspects of the disclosure.

FIG. 22 is a block diagram illustrating an example of a computing system 2200, which may be employed by the disclosed V2X-sensor misbehavior detection system, in accordance with some aspects of the present disclosure. In particular, FIG. 22 illustrates an example of computing system 2200, which can be for example any computing device making up internal computing system, a remote computing system, a camera, or any component thereof in which the components of the system are in communication with each other using connection 2205. Connection 2205 can be a physical connection using a bus, or a direct connection into processor 2210, such as in a chipset architecture. Connection 2205 can also be a virtual connection, networked connection, or logical connection.

In some aspects, computing system 2200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 2200 includes at least one processing unit (CPU or processor) 2210 and connection 2205 that communicatively couples various system components including system memory 2215, such as read-only memory (ROM) 2220 and random access memory (RAM) 2225 to processor 2210. Computing system 2200 can include a cache 2212 of high-speed memory connected directly with, in close proximity to, or integrated as part of processor 2210.

Processor 2210 can include any general purpose processor and a hardware service or software service, such as services 2232, 2234, and 2236 stored in storage device 2230, configured to control processor 2210 as well as a special-purpose processor where software instructions are incorporated into the actual processor design. Processor 2210 may essentially be a completely self-contained computing system, containing multiple cores or processors, a bus, memory controller, cache, etc. A multi-core processor may be symmetric or asymmetric.

To enable user interaction, computing system 2200 includes an input device 2245, which can represent any number of input mechanisms, such as a microphone for speech, a touch-sensitive screen for gesture or graphical input, keyboard, mouse, motion input, speech, etc. Computing system 2200 can also include output device 2235, which can be one or more of a number of output mechanisms. In some instances, multimodal systems can enable a user to provide multiple types of input/output to communicate with computing system 2200.

Computing system 2200 can include communications interface 2240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 2240 may also include one or more range sensors (e.g., LIDAR sensors, laser range finders, RF radars, ultrasonic sensors, and infrared (IR) sensors) configured to collect data and provide measurements to processor 2210, whereby processor 2210 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 2240 may also include one or more Global Navigation Satellite System (GNSS) receivers or transceivers that are used to determine a location of the computing system 2200 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 2230 can include software services, servers, services, etc., that when the code that defines such software is executed by the processor 2210, it causes the system to perform a function. In some aspects, a hardware service that performs a particular function can include the software component stored in a computer-readable medium in connection with the necessary hardware components, such as processor 2210, connection 2205, output device 2235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to (" ") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A method for wireless communications at a network device, the method comprising: detecting an object based on sensor data from at least one sensor of the network device; receiving, by the network device, a vehicle-based message comprising message data related to the object; comparing, by the network device, the sensor data and the message data; and detecting, by the network device, malicious behavior based on the comparing.

Aspect 2: The method of Aspect 1, wherein the vehicle-based message is one of a Basic Safety Message (BSM), a Cooperative Awareness Message (CAM), a Collective Perception Message (CPM), a Sensor Data Sharing Message (SDSM), a Decentralized Environmental Message (DENM), or a Signal, Phase, and Time (SPaT) message.

Aspect 3: The method of any of Aspects 1 to 2, further comprising generating, by the network device, a misbehavior report comprising information associated with the malicious behavior.

Aspect 4: The method of Aspect 3, further comprising transmitting, by the network device, the misbehavior report to a misbehavior authority.

Aspect 5: The method of any of Aspects 1 to 4, wherein the malicious behavior is inclusion of incorrect information contained within the vehicle-based message.

Aspect 6: The method of Aspect 5, wherein the incorrect information includes at least one of a ghost object or simulated free space within the vehicle-based message.

Aspect 7: The method of any of Aspects 1 to 6, further comprising disabling or enabling a first sensor of the at least one sensor based on at least one of a status of the first sensor, a capability of the first sensor, or a characteristic of an environment in which the network device is located.

Aspect 8: The method of Aspect 7, wherein the characteristic of the environment includes weather in the environment.

Aspect 9: The method of any of Aspects 1 to 8, further comprising assigning or adjusting a weight for the sensor data based on a capability of the at least one sensor.

Aspect 10: The method of Aspect 9, wherein the capability of the at least one sensor is related to an operability of the at least one sensor during weather conditions experienced by the at least one sensor in an environment in which the network device is located.

Aspect 11: The method of any of Aspects 1 to 10, further comprising adjusting a detection range of the at least one sensor based on a capability of the at least one sensor.

Aspect 12: The method of Aspect 11, wherein the capability of the at least one sensor is related to an operability of the at least one sensor during weather conditions experienced by the at least one sensor in an environment in which the network device is located.

Aspect 13: The method of any of Aspects 1 to 12, further comprising removing simulated objects from the sensor data.

Aspect 14: The method of any of Aspects 1 to 13, wherein the comparing further comprises comparing the sensor data and the message data to map data.

Aspect 15: The method of Aspect 14, wherein the map data comprises at least one of satellite data or a local map.

Aspect 16: The method of any of Aspects 1 to 15, wherein the at least one sensor is at least one of a camera, a radar sensor, or a Light Detection and Ranging (LIDAR) sensor.

Aspect 17: The method of any of Aspects 1 to 16, wherein the network device is one of a vehicle, user equipment (UE), a roadside unit (RSU), traffic infrastructure, or a drone.

Aspect 18: The method of any of Aspects 1 to 17, wherein the network device is capable of Vehicle-to-Everything (V2X) communications.

Aspect 19: An apparatus for wireless communications, comprising at least one memory and at least one processor (e.g., implemented in circuitry) coupled to the at least one memory. The at least one is configured to: detect an object based on sensor data from at least one sensor of the network device; receiving, by the network device, a vehicle-based message comprising message data related to the object; comparing, by the network device, the sensor data and the message data; and detecting, by the network device, malicious behavior based on the comparing.

Aspect 20: The apparatus of Aspect 19, wherein the vehicle-based message is one of a Basic Safety Message (BSM), a Cooperative Awareness Message (CAM), a Collective Perception Message (CPM), a Sensor Data Sharing Message (SDSM), a Decentralized Environmental Message (DENM), or a Signal, Phase, and Time (SPaT) message.

Aspect 21: The apparatus of any of Aspects 19 to 20, wherein the at least one processor is configured to generate a misbehavior report comprising information associated with the malicious behavior.

Aspect 22: The apparatus of Aspect 21, wherein the at least one processor is configured to output the misbehavior report for transmission to a misbehavior authority.

Aspect 23: The apparatus of any of Aspects 19 to 22, wherein the malicious behavior is inclusion of incorrect information contained within the vehicle-based message.

Aspect 24: The apparatus of Aspect 23, wherein the incorrect information includes at least one of a ghost object or simulated free space within the vehicle-based message.

Aspect 25: The apparatus of any of Aspects 19 to 24, wherein the at least one processor is configured to disable or enable a first sensor of the at least one sensor based on at least one of a status of the first sensor, a capability of the first sensor, or a characteristic of an environment in which the network device is located.

Aspect 26: The apparatus of Aspect 25, wherein the characteristic of the environment includes weather in the environment.

Aspect 27: The apparatus of any of Aspects 19 to 26, wherein the at least one processor is configured to assign or adjust a weight for the sensor data based on a capability of the at least one sensor.

Aspect 28: The apparatus of Aspect 27, wherein the capability of the at least one sensor is related to an operability of the at least one sensor during weather conditions experienced by the at least one sensor in an environment in which the network device is located.

Aspect 29: The apparatus of any of Aspects 19 to 28, wherein the at least one processor is configured to adjust a detection range of the at least one sensor based on a capability of the at least one sensor.

Aspect 30: The apparatus of Aspect 29, wherein the capability of the at least one sensor is related to an operability of the at least one sensor during weather conditions experienced by the at least one sensor in an environment in which the network device is located.

Aspect 31: The apparatus of any of Aspects 19 to 30, wherein the at least one processor is configured to remove simulated objects from the sensor data.

Aspect 32: The apparatus of any of Aspects 19 to 31, wherein, to compare the sensor data and the message data, the at least one processor is configured to compare.

Aspect 33: The apparatus of Aspect 32, wherein the map data comprises at least one of satellite data or a local map.

Aspect 34: The apparatus of any of Aspects 19 to 33, wherein the at least one sensor is at least one of a camera, a radar sensor, or a Light Detection and Ranging (LIDAR) sensor.

Aspect 35: The apparatus of any of Aspects 19 to 34, wherein the network device is one of a vehicle, user equipment (UE), a roadside unit (RSU), traffic infrastructure, or a drone.

Aspect 36: The apparatus of any of Aspects 19 to 35, wherein the network device is capable of Vehicle-to-Everything (V2X) communications.

Aspect 37: The apparatus of any of Aspects 19 to 36, wherein the apparatus is implemented as the network device, and further comprising at least one transceiver configured to receive the vehicle-based message.

Aspect 38: A non-transitory computer-readable storage medium comprising instructions stored thereon which, when executed by one or more processors, cause the one or more processors to perform operations according to any of aspects 1 to 18.

Aspect 39: An apparatus for wireless communications, comprising one or more means for performing operations according to any of aspects 1 to 18.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for wireless communications at a network device, the method comprising:
   receiving, by the network device, a vehicle-based message comprising message data related to an object in an environment in which the network device is located;
   collecting fusion sensor data associated with the environment from a plurality of sensors, wherein sensor data of the fusion sensor data from each respective sensor of the plurality of sensors is respectively weighted based on a respective confidence level associated with a detection range of each respective sensor of the plurality of sensors, and wherein at least two sensors of the plurality of sensors have different detection ranges;
   comparing, by the network device, the fusion sensor data and the message data; and
   determining, by the network device, whether there is malicious behavior based on the comparing.

2. The method of claim 1, wherein the vehicle-based message is one of a Basic Safety Message (BSM), a Cooperative Awareness Message (CAM), a Collective Perception Message (CPM), a Sensor Data Sharing Message (SDSM), a Decentralized Environmental Message (DENM), or a Signal, Phase, and Time (SPaT) message.

3. The method of claim 1, further comprising generating, by the network device, a misbehavior report comprising information associated with detected malicious behavior.

4. The method of claim 3, further comprising transmitting, by the network device, the misbehavior report to a misbehavior authority.

5. The method of claim 1, further comprising:
   determining incorrect information is contained within the vehicle-based message based on comparing the fusion sensor data and the vehicle-based message; and
   determining there is the malicious behavior based on the incorrect information contained within the vehicle-based message.

6. The method of claim 5, wherein the incorrect information includes at least one of a ghost object or simulated free space within the vehicle-based message.

7. The method of claim 1, further comprising determining whether to disable or enable a first sensor of the plurality of sensors based on at least one of a status of the first sensor, a capability of the first sensor, or a characteristic of the environment.

8. The method of claim 7, wherein the characteristic of the environment includes weather in the environment.

9. The method of claim 1, wherein the respective confidence level of each sensor of the plurality of sensors is further associated with an operability of each sensor during weather conditions experienced by the plurality of sensors in the environment.

10. The method of claim 1, further comprising adjusting the detection range of each sensor of the plurality of sensors based on a respective capability of each sensor of the plurality of sensors.

11. The method of claim 10, wherein the respective capability of each sensor of the plurality of sensors is related to an operability of each sensor of the plurality of sensors during weather conditions experienced by the plurality of sensors in the environment.

12. The method of claim 1, further comprising removing simulated objects from the fusion sensor data.

13. The method of claim 1, wherein the comparing further comprises comparing the fusion sensor data, the message data, and map data.

14. The method of claim 13, wherein the map data comprises at least one of satellite data or a local map.

15. The method of claim 1, wherein the plurality of sensors include at least one of a camera, a radar sensor, or a Light Detection and Ranging (LIDAR) sensor.

16. The method of claim 1, wherein the network device is one of a vehicle, user equipment (UE), a roadside unit (RSU), traffic infrastructure, or a drone.

17. The method of claim 1, wherein the network device is capable of Vehicle-to-Everything (V2X) communications.

18. The method of claim 1, further comprising:
   determining there is the malicious behavior based on the object being undetected in the fusion sensor data.

19. The method of claim 1, further comprising:
   determining there is no malicious behavior based on a detection of the object in the fusion sensor data.

20. An apparatus for wireless communications, comprising:
   at least one memory; and
   at least one processor coupled to the at least one memory and configured to:
      receive a vehicle-based message comprising message data related to an object in an environment in which the apparatus is located;
      collecting fusion sensor data associated with the environment from a plurality of sensors, wherein sensor data of the fusion sensor data from each respective sensor of the plurality of sensors is respectively weighted based on a respective confidence level associated with a detection range of each respective sensor of the plurality of sensors, and wherein at least two sensors of the plurality of sensors have different detection ranges;
      compare the fusion sensor data and the message data; and determining whether there is malicious behavior based on the comparing.

21. The apparatus of claim 20, wherein the vehicle-based message is one of a Basic Safety Message (BSM), a Cooperative Awareness Message (CAM), a Collective Perception Message (CPM), a Sensor Data Sharing Message (SDSM), a Decentralized Environmental Message (DENM), or a Signal, Phase, and Time (SPaT) message.

22. The apparatus of claim 20, wherein the at least one processor is configured to generate a misbehavior report comprising information associated with detected malicious behavior.

23. The apparatus of claim 22, wherein the at least one processor is configured to output the misbehavior report for transmission to a misbehavior authority.

24. The apparatus of claim 20, wherein the at least one processor is configured to:
   determine incorrect information is contained within the vehicle-based message based on comparing the fusion sensor data and the vehicle-based message; and
   determine the malicious behavior based on the incorrect information contained within the vehicle-based message.

25. The apparatus of claim 24, wherein the incorrect information includes at least one of a ghost object or simulated free space within the vehicle-based message.

26. The apparatus of claim 20, wherein the at least one processor is configured to determine whether to disable or enable a first sensor of the plurality of sensors based on at least one of a status of the first sensor, a capability of the first sensor, or a characteristic of the environment.

27. The apparatus of claim 26, wherein the characteristic of the environment includes weather in the environment.

28. The apparatus of claim 20, wherein the respective confidence level of each sensor of the plurality of sensors is related to an operability of each sensor during weather conditions experienced by the plurality of sensors in the environment.

29. The apparatus of claim 20, wherein the at least one processor is configured to adjust the detection range of each sensor of the plurality of sensors based on a respective capability of each sensor of the plurality of sensors.

30. The apparatus of claim 29, wherein the respective capability of each sensor of the plurality of sensors is related to an operability of each sensor of the plurality of sensors during weather conditions experienced by the plurality of sensors in the environment.

31. The apparatus of claim 20, wherein the at least one processor is configured to remove simulated objects from the fusion sensor data.

32. The apparatus of claim 20, wherein, to compare the fusion sensor data and the message data, the at least one processor is configured to compare the fusion sensor data, the message data, and map data.

33. The apparatus of claim 32, wherein the map data comprises at least one of satellite data or a local map.

34. The apparatus of claim 20, wherein the plurality of sensors includes at least one of a camera, a radar sensor, or a Light Detection and Ranging (LIDAR) sensor.

35. The apparatus of claim 20, wherein the apparatus is one of a vehicle, user equipment (UE), a roadside unit (RSU), traffic infrastructure, or a drone.

36. The apparatus of claim 20, wherein the apparatus is capable of Vehicle-to-Everything (V2X) communications.

37. The apparatus of claim 20, wherein the apparatus is implemented as a network device, and further comprising:
   at least one transceiver configured to receive the vehicle-based message.

* * * * *